(12) United States Patent
Devadoss et al.

(10) Patent No.: US 11,438,789 B2
(45) Date of Patent: Sep. 6, 2022

(54) COMPUTING AND USING DIFFERENT PATH QUALITY METRICS FOR DIFFERENT SERVICE CLASSES

(71) Applicant: VMware, Inc., Palo Alto, CA (US)

(72) Inventors: Jegadish Devadoss, Chennai (IN); Kartik Kamdar, San Jose, CA (US); Stephen Craig Connors, San Jose, CA (US); Satheesh Kumar Rajendran, Chennai (IN); Ram Kumar Manoharan, Chennai (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/851,294

(22) Filed: Apr. 17, 2020

(65) Prior Publication Data
US 2021/0234775 A1    Jul. 29, 2021

(30) Foreign Application Priority Data
Jan. 24, 2020  (IN) .............................. 202041003220

(51) Int. Cl.
*H04W 28/02*    (2009.01)
*H04L 43/062*    (2022.01)
(Continued)

(52) U.S. Cl.
CPC ....... *H04W 28/0268* (2013.01); *H04L 43/062* (2013.01); *H04L 43/087* (2013.01);
(Continued)

(58) Field of Classification Search
None
See application file for complete search history.

(56) References Cited

U.S. PATENT DOCUMENTS

| 5,652,751 A | 7/1997 | Sharony |
| 5,909,553 A | 6/1999 | Campbell et al. |

(Continued)

FOREIGN PATENT DOCUMENTS

| CN | 1926809 A | 3/2007 |
| CN | 102811165 A | 12/2012 |

(Continued)

OTHER PUBLICATIONS

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.
(Continued)

*Primary Examiner* — Lonnie V Sweet
(74) *Attorney, Agent, or Firm* — Adeli LLP

(57) ABSTRACT

Some embodiments provide a method for quantifying quality of several service classes provided by a link between first and second forwarding nodes in a wide area network (WAN). At a first forwarding node, the method computes and stores first and second path quality metric (PQM) values based on packets sent from the second forwarding node for the first and second service classes. The different service classes in some embodiments are associated with different quality of service (QoS) guarantees that the WAN offers to the packets. In some embodiments, the computed PQM value for each service class quantifies the QoS provided to packets processed through the service class. In some embodiments, the first forwarding node adjusts the first and second PQM values as it processes more packets associated with the first and second service classes. The first forwarding node also periodically forwards to the second forwarding node the first and second PQM values that it maintains for the first and second service classes. In some embodiments, the second forwarding node performs a similar set of opera-
(Continued)

tions to compute first and second PQM values for packets sent from the first forwarding node for the first and second service classes, and to provide these PQM values to the first forwarding node periodically.

20 Claims, 13 Drawing Sheets

(51) Int. Cl.
    *H04L 43/0829*     (2022.01)
    *H04L 43/0852*     (2022.01)
    *H04L 43/087*     (2022.01)
    *H04L 47/2408*     (2022.01)
    *H04L 47/2441*     (2022.01)
    *H04L 47/2425*     (2022.01)
    *H04L 47/80*     (2022.01)
    *H04L 45/302*     (2022.01)
    *H04L 43/10*     (2022.01)
    *H04L 45/50*     (2022.01)
    *H04L 49/20*     (2022.01)
    *H04L 49/55*     (2022.01)

(52) U.S. Cl.
    CPC ...... *H04L 43/0835* (2013.01); *H04L 43/0858* (2013.01); *H04L 43/10* (2013.01); *H04L 45/302* (2013.01); *H04L 45/50* (2013.01); *H04L 47/2408* (2013.01); *H04L 47/2425* (2013.01); *H04L 47/2441* (2013.01); *H04L 47/805* (2013.01); *H04L 49/205* (2013.01); *H04L 49/555* (2013.01)

(56) References Cited

U.S. PATENT DOCUMENTS

| | | |
|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,566,452 B1 | 10/2013 | Goodwin et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 * | 12/2015 | Shirazipour ............ H04L 47/24 |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 10,038,601 B1 | 7/2018 | Becker et al. |
| 10,057,183 B2 | 8/2018 | Salle et al. |
| 10,057,294 B2 | 8/2018 | Xu |
| 10,135,789 B2 | 11/2018 | Mayya et al. |
| 10,142,226 B1 | 11/2018 | Wu et al. |
| 10,178,032 B1 | 1/2019 | Freitas |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchai et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |

(56) References Cited

U.S. PATENT DOCUMENTS

| | | |
|---|---|---|
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,528 B2 | 2/2020 | Mayya et al. |
| 10,594,516 B2 | 3/2020 | Cidon et al. |
| 10,594,659 B2 | 3/2020 | El-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,686,625 B2 | 6/2020 | Cidon et al. |
| 10,693,739 B1 | 6/2020 | Naseri et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0198840 A1 | 12/2002 | Banka et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1* | 5/2008 | Chakareski ......... H04L 47/2416 370/465 |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Kiessig et al. |
| 2009/0141642 A1 | 6/2009 | Sun |
| 2009/0154463 A1 | 6/2009 | Hines et al. |
| 2009/0247204 A1 | 10/2009 | Sennett et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1* | 9/2011 | Szymanski ............. H04L 47/20 370/230 |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shalzkamer et al. |

(56) References Cited

U.S. PATENT DOCUMENTS

| | | |
|---|---|---|
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103834 A1 | 4/2013 | Dzerve et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1* | 6/2014 | Saund ............... G06F 13/1642 718/102 |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1* | 4/2016 | Cociglio ............... H04L 43/50 370/252 |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |

(56) References Cited

U.S. PATENT DOCUMENTS

| | | |
|---|---|---|
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1* | 1/2018 | Boggia ............... H04L 65/4084 |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |

(56) References Cited

U.S. PATENT DOCUMENTS

| | | |
|---|---|---|
| 2019/0020588 A1 | 1/2019 | Twitchell, Jr. |
| 2019/0020627 A1 | 1/2019 | Yuan |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1 | 8/2019 | Markuze et al. |
| 2019/0268973 A1 | 8/2019 | Bull et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0334813 A1 | 10/2019 | Raj et al. |
| 2019/0334820 A1 | 10/2019 | Zhao |
| 2019/0342219 A1* | 11/2019 | Liu .............. H04L 12/4641 |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0059420 A1 | 2/2020 | Abraham |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0169473 A1 | 5/2020 | Rimar et al. |
| 2020/0177503 A1 | 6/2020 | Hooda et al. |
| 2020/0177550 A1 | 6/2020 | Vallur et al. |
| 2020/0177629 A1 | 6/2020 | Hooda et al. |
| 2020/0186471 A1 | 6/2020 | Shen et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412576 A1 | 12/2020 | Kondapavuluru et al. |
| 2020/0413283 A1 | 12/2020 | Shen et al. |
| 2021/0006482 A1* | 1/2021 | Hwang .............. H04L 43/103 |
| 2021/0006490 A1 | 1/2021 | Michael et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0092062 A1 | 3/2021 | Dhanabalan et al. |
| 2021/0105199 A1 | 4/2021 | H et al. |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | C H et al. |
| 2021/0160169 A1 | 5/2021 | Shen et al. |
| 2021/0160813 A1 | 5/2021 | Gupta et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0279069 A1 | 9/2021 | Salgaonkar et al. |
| 2021/0314289 A1 | 10/2021 | Chandrashekhar et al. |
| 2021/0328835 A1 | 10/2021 | Mayya et al. |
| 2021/0336880 A1 | 10/2021 | Gupta et al. |

(56) References Cited

U.S. PATENT DOCUMENTS

| | | | |
|---|---|---|---|
| 2021/0377109 | A1 | 12/2021 | Shrivastava et al. |
| 2021/0377156 | A1 | 12/2021 | Michael et al. |
| 2021/0392060 | A1 | 12/2021 | Silva et al. |
| 2021/0392070 | A1 | 12/2021 | Tootaghaj et al. |
| 2021/0399920 | A1 | 12/2021 | Sundararajan et al. |
| 2021/0399978 | A9 | 12/2021 | Michael et al. |
| 2021/0400113 | A1 | 12/2021 | Markuze et al. |
| 2022/0038370 | A1 | 2/2022 | Vasseur et al. |

FOREIGN PATENT DOCUMENTS

| | | | |
|---|---|---|---|
| CN | 104956329 | A | 9/2015 |
| CN | 106656847 | A | 5/2017 |
| CN | 110447209 | A | 11/2019 |
| CN | 111198764 | A | 5/2020 |
| EP | 1912381 | A1 | 4/2008 |
| EP | 3041178 | A1 | 7/2016 |
| EP | 3509256 | A1 | 7/2019 |
| JP | 2017059991 | A | 3/2017 |
| RU | 2574350 | C2 | 2/2016 |
| WO | 03073701 | | 9/2003 |
| WO | 2012167184 | A2 | 12/2012 |
| WO | 2016061546 | A1 | 4/2016 |
| WO | 2017083975 | A1 | 5/2017 |
| WO | 2019070611 | A1 | 4/2019 |
| WO | 2019094522 | A1 | 5/2019 |
| WO | 2020012491 | A1 | 1/2020 |
| WO | 2020018704 | A1 | 1/2020 |
| WO | 2020091777 | A1 | 5/2020 |
| WO | 2020101922 | A1 | 5/2020 |
| WO | 2020112345 | A1 | 6/2020 |
| WO | 2021040934 | A1 | 3/2021 |
| WO | 2021118717 | A1 | 6/2021 |
| WO | 2021150465 | A1 | 7/2021 |
| WO | 2021211906 | A1 | 10/2021 |

OTHER PUBLICATIONS

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Non-Published Commonly Owned U.S. Appl. No. 17/068,603, filed Oct. 12, 2020, 37 pages, Nicira, Inc.

Non-Published Commonly Owned U.S. Appl. No. 15/803,964, filed Nov. 6, 2017, 15 pages. The Mode Group.

Non-Published Commonly Owned U.S. Appl. No. 16/216,235, filed Dec. 11, 2018, 19 pages. The Mode Group.

Non-Published Commonly Owned U.S. Appl. No. 16/818,862, filed Mar. 13, 2020, 198 pages. The Mode Group.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Webb, Kevin C., et al., "Blender: Upgrading Tenant-Based Data Center Networking," 2014 ACM/IEEE Symposium an Architectures for Networking and Communications Systems (ANCS), Oct. 20-21, 2014, 11 pages, IEEE, Marina del Rey, CA, USA.

Yap, Kok-Kiong, et al., "Taking the Edge off with Espresso: Scale, Reliability and Programmability for Global ntemet Peering," SIGCOMM '17: Proceedings of the Conference of the ACM Special Interest Group on Data Communication, Aug. 21-25, 2017, 14 pages, Los Angeles, CA.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Non-published Commonly Owned U.S. Appl. No. 17/187,913, filed Mar. 1, 2021, 27 pages, Nicira, Inc.

Mudigonda, Jay Aram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 16/662,363, filed Oct. 24, 2019, 129 pages, VMware, Inc.

Non-Published Commonly Owned U.S. Appl. No. 16/662,379, filed Oct. 24, 2019, 123 pages, VMware, Inc.

Non-Published Commonly Owned U.S. Appl. No. 16/662,402, filed Oct. 24, 2019, 128 pages, VMware, Inc.

Non-Published Commonly Owned U.S. Appl. No. 16/662,427, filed Oct. 24, 2019, 165 pages, VMware, Inc.

Non-Published Commonly Owned U.S. Appl. No. 16/662,489, filed Oct. 24, 2019, 165 pages, VMware, Inc.

Non-Published Commonly Owned U.S. Appl. No. 16/662,510, filed Oct. 24, 2019, 165 pages, VMware, Inc.

Non-Published Commonly Owned U.S. Appl. No. 16/662,531, filed Oct. 24, 2019, 135 pages, VMware, Inc.

Non-Published Commonly Owned U.S. Appl. No. 16/662,570, filed Oct. 24, 2019, 141 pages, VMware, Inc.

Non-Published Commonly Owned U.S. Appl. No. 16/662,587, filed Oct. 24, 2019, 145 pages, VMware, Inc.

Non-Published Commonly Owned U.S. Appl. No. 16/662,591, filed Oct. 24, 2019, 130 pages, VMware, Inc.

Non-Published Commonly Owned U.S. Appl. No. 16/721,964, filed Dec. 20, 2019, 39 pages, VMware, Inc.

Non-Published Commonly Owned U.S. Appl. No. 16/721,965, filed Dec. 20, 2019, 39 pages, VMware, Inc.

Non-Published Commonly Owned U.S. Appl. No. 16/785,628, filed Feb. 9, 2020, 44 pages, Micira, Inc.

Non-Published Commonly Owned U.S. Appl. No. 16/792,908, filed Feb. 18, 2020, 48 pages, VMware, Inc.

Non-Published Commonly Owned U.S. Appl. No. 16/792,909, filed Feb. 18, 2020, 49 pages, VMware, Inc.

Non-Published Commonly Owned Related U.S. Appl. No. 16/851,301 with similar specification, filed Apr. 17, 2020, 59 pages, VMware, Inc.

Non-Published Commonly Owned Related U.S. Appl. No. 16/851,308 with similar specification, filed Apr. 17, 2020, 59 pages, VMware, Inc.

Non-Published Commonly Owned Related U.S. Appl. No. 16/851,314 with similar specification, filed Apr. 17, 2020, 59 pages, VMware, Inc.

Non-Published Commonly Owned Related U.S. Appl. No. 16/851,323 with similar specification, filed Apr. 17, 2020, 59 pages, VMware, Inc.

Non-Published Commonly Owned Related U.S. Appl. No. 16/851,397 with similar specification, filed Apr. 17, 2020, 59 pages, VMware, Inc.

Non-Published Commonly Owned U.S. Appl. No. 16/945,700, filed Jul. 31, 2020, 37 pages, Nicira, Inc.

Non-Published Commonly Owned U.S. Appl. No. 16/945,867, filed Aug. 1, 2020, 30 pages, Nicira, Inc.

Non-Published Commonly Owned Related International Patent Application PCT/US2021/013846 with similar specification, filed Jan. 19, 2021, 59 pages, VMware, Inc.

Non-Published Commonly Owned U.S. Appl. No. 17/233,427, filed Apr. 16, 2021, 124 pages, VMware, Inc.

Non-Published Commonly Owned U.S. Appl. No. 17/361,292, filed Jun. 28, 2021, 35 pages, Nicira, Inc.

(56) References Cited

OTHER PUBLICATIONS

Sarhan, Soliman Abd Elmonsef, et al., "Data Inspection in SDN Network," 2018 13th International Conference an Computer Engineering and Systems (ICCES), Dec. 18-19, 2018, 6 pages, IEEE, Cairo, Egypt.
Xie, Junfeng, et al., A Survey of Machine Learning Techniques Applied to Software Defined Networking (SDN) Research Issues and Challenges, IEEE Communications Surveys & Tutorials, Aug. 23, 2018, 38 pages, vol. 21, Issue 1, IEEE.
Guo, Xiangyi, et al., (U.S. Appl. No. 62/925,193), filed Oct. 23, 2019, 26 pages.
Lasserre, Marc, et al., "Framework for Data Center (DC) Network Virtualization," RFC 7365, Oct. 2014, 26 pages, IETF.
Lin, Weidong, et al., "Using Path Label Routing in Wide Area Software-Defined Networks with Open Flow," 2016 International Conference on Networking and Network Applications, Jul. 2016, 6 pages, IEEE.
Non-Published Commonly Owned U.S. Appl. No. 17/240,890, filed Apr. 26, 2021, 325 pages, VMware, Inc.
Non-Published Commonly Owned U.S. Appl. No. 17/240,906, filed Apr. 26, 2021, 18 pages, VMware, Inc.
Non-Published Commonly Owned U.S. Appl. No. 17/467,378, filed Sep. 6, 2021, 157 pages, VMware, Inc.
Non-Published Commonly Owned U.S. Appl. No. 17/474,034, filed Sep. 13, 2021, 349 pages, VMware, Inc.
Non-Published Commonly Owned U.S. Appl. No. 17/542,413, filed Dec. 4, 2021, 173 pages, VMware, Inc.
Non-Published Commonly Owned U.S. Appl. No. 17/562,890, filed Dec. 27, 2021, 36 pages, VMware, Inc.
PCT International Search Report and Written Opinion of Commonly Owned International Patent Application PCT/JS2021/013846, dated Mar. 22, 2021, 12 pages, International Searching Authority (EPO).
Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.
Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.
Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.
Cox, Jacob H., et al., "Advancing Software-Defined Networks: A Survey," IEEE Access, Oct. 12, 2017, 40 pages. vol. 5, IEEE, retrieved from https://ieeexplore.ieee.org/document/8066287.
Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.
Long, Feng, "Research and Application of Cloud Storage Technology in University Information Service," Chinese Excellent Masters' Theses Full-text Database, Mar. 2013, 72 pages, China Academic Journals Electronic Publishing House, China.
Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IFFF, Toronto, ON, Canada.
Barozet, Jean-Marc, "Cisco SD-WAN as a Managed Service," BRKRST-2558, Jan. 27-31, 2020, 98 pages, Disco, Barcelona, Spain, retrieved from https://www.ciscolive.eom/c/dam/r/ciscolive/emea/docs/2020/pdf/BRKRST-2558.pdf.
Barozei, Jean-Marc, "Cisco SDWAN," Deep Dive, Dec. 2017, 185 pages, Cisco, Retreived from https://www.coursehero. com/file/71671376/Cisco-SDWAN-Deep-Divepdf/.
Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

* cited by examiner

COMPUTING AND USING DIFFERENT PATH QUALITY METRICS FOR DIFFERENT SERVICE CLASSES

In recent years, several companies have brought to market solutions for deploying software defined (SD) wide-area networks (WANs) for enterprises. Some such SD-WAN solutions use external third-party private or public cloud datacenters (clouds) to define different virtual WANs for different enterprises. These solutions typically have edge forwarding elements (called edge devices) at edge nodes of an enterprise that connect with one or more gateway forwarding elements (called gateway devices or gateways) that are deployed in the third-party clouds.

In such a deployment, an edge device connects through one or more secure connections with a gateway, with these connections traversing one or more network links that connect the edge device with an external network. Examples of such network links include MPLS links, 5G LTE links, commercial broadband Internet links (e.g., cable modem links or fiber optic links), etc. The edge nodes include branch offices (called branches) of the enterprise, and these offices are often spread across geographies with network links to the gateways of various different network connectivity types.

In existing WAN and SD-WANs, there is a lack of proper error resilient transport methods for QoS aware links. Retransmission of lost packets, packet replication and forward-error-correction (FEC) are some known methods to provide transport error resiliency. These methods can also be adaptively turned on based on the PQM values on the path. Retransmission method detects packet loss and makes a decision to resend the lost packet. The fundamental need for all these methods is to constantly measure path quality metrics (PQMs), such as loss, delay and jitter, between two WAN endpoints. PQM can be measured by tagging each packet with an incremental number (sequence number) and timestamp.

These common methods cannot be easily applied in QoS aware links. The QoS aware links can treat packets differently depending on the service to which it is entitled. For instance, in a transit QoS device, packets can be placed in different scheduler service queues or policed/capped/dropped at a different rate depending on its type. However, when the packets get mapped to different scheduler queues in the transit QoS device, packets sent in sequence (with sequence numbers carried in packet) from one WAN edge endpoint can get out of ordered before it reaches the other WAN edge endpoint. The out of order delivery prevents proper packet loss computation on the path between two WAN endpoints, and can potentially lead to wrong packet PQM value calculations.

Traffic outage reports on the path also cannot be relied on. A path (i.e., a connection) between two WAN endpoints can experience outages due to severe congestion and subsequent drops in transit QoS device. To quickly detect and failover to alternate path, existing WAN send heartbeat messages periodically once every X millisecond between two forwarding elements along the path. Loss of certain Y consecutive heartbeat messages can be used to quickly detect path outages and move traffic to alternate paths available between the same endpoints.

Such existing path outage detection does not work for QoS aware links because the heartbeat message sent on a QoS aware link will get mapped to the same service queue in the transit QoS device. For instance, in an MPLS link, a WAN edge node typically sends heartbeat messages with a default DSCP tag or a specific DSCP tag. This causes all the heartbeat messages to be serviced out from the same service queue in the transit QoS device. This will lead to the loss of heartbeat messages and the path can be marked down, even though other queues are not experiencing any congestion and are in good state to process traffic.

A high loss of heartbeats can be associated with a path that is unfit to carry a particular application traffic. The unfit state of a path can be detected by checking whether the path's PQM values are within a threshold of acceptable values. The existing methods will not work for a QoS aware links because there could be a high loss in one of the service queues of the QoS aware link but this shall reflect as a high loss in whole of that path and the entire path can be marked as unusable for traffic steering. But a potential possibility is that other service queues could be uncongested and have free bandwidth for use. This leads to highly inefficient bandwidth usage and which in turn can lead to bad application traffic performance.

BRIEF SUMMARY

Some embodiments provide a method for quantifying quality of several service classes provided by a network link used to establish a path between first and second forwarding nodes in a wide area network (WAN). At a first forwarding node, the method (1) computes first and second path quality metric (PQM) values based on packets sent from the second forwarding node for the first and second service classes, and (2) uses these PQM values to manage the packet processing through these service classes. In some embodiments, an example of a network link that offers several service classes include an MPLS (multi-path label switching) link, while examples of forwarding nodes include edge nodes deployed in branch offices, edge nodes deployed in datacenters, and gateways deployed in public or private cloud datacenters.

In some embodiments, the forwarding nodes of the WAN (including the first and second forwarding nodes) are part of an overlay network that is established by using overlay network headers for the packets. The overlay network is a software-defined (SD) WAN in some embodiments. The forwarding nodes of the SD-WAN in some embodiments use encapsulating tunnel headers to allow the packet's overlay network headers to be transparent to the underlay network fabric that the packets traverse.

Also, in some embodiments, the different service classes are associated with different quality of service (QoS) guarantees that the WAN offers to the packets. Examples of such guarantees include throughput, uptime reliability, etc. A network link with two or more service classes is referred to below as a QoS aware link. In some embodiments, the computed PQM value for each service class quantifies the QoS provided to packets processed through the service class.

In some embodiments, the first forwarding node adjusts the first and second PQM values as it processes more packets associated with the first and second service classes. The first forwarding node periodically forwards to the second forwarding node the first and second PQM values that it maintains for the first and second service classes. In some embodiments, the second forwarding node performs a similar set of operations to compute first and second PQM values for packets sent from the first forwarding node for the first and second service classes, and to provide these PQM values to the first forwarding node periodically. Each forwarding node uses the first and second PQM values received by the other forwarding node to assess the quality of the first and second service classes for forwarding data packets to the other forwarding node.

To differentiate the first and second service classes, the first forwarding node uses different sets of sequence numbers for these service classes. In some embodiments, each service class has a sequence number range (called the primary sequence number range) that is formed by an identifier of the service class plus another sequence number range (called the secondary sequence number range). The different service classes in some embodiments can use the same secondary sequence number range as their primary sequence number range because of their different service class identifiers. In some SD-WAN embodiments that use MPLS, the service class identifier is the DSCP (differentiated service code point) tag associated with the service class. In other embodiments that use MPLS, the service class identifiers are not the DSCP tags.

The forwarding nodes compute different PQM values in different embodiments. For instance, for each service class, each forwarding node in some embodiments computes packet loss, delay and jitter as three PQM values for the service class. To compute PQM values for each service class, a forwarding node uses the sequence numbers associated with the packets to differentiate the service classes associated with the packets. For example, to compute packet loss for a service class, the forwarding node in some embodiments uses the sequence numbers of the service classes to maintain counts of packets that are not received timely and sequentially, and uses the time average of this count as the average packet loss for the service class.

To compute the packet delay for the service class, the forwarding node in some embodiments computes (1) a delay value for each packet by computing a difference between a time stamp contained in the packet's header and the time the forwarding node received the packet, and (2) averages this delay with other delay values it computed for packets associated with the same service class. Again, the forwarding node identifies the packets associated with the same service class based on the packet sequence numbers that are associated with the service class. The forwarding node in some embodiments computes the packet jitter as a derivative of the packet delay values that it computes (i.e., based on the rate of change of the delay value).

Computing PQM values for each service class allows some embodiments to treat each service class as an independent logical sub-path of the path between first and second forwarding nodes that is established by one network link. Hence, when one service class is congested, the forwarding nodes can reduce or eliminate their use of this service class while continuing to use the other service classes offered by the network link. Some embodiments generate PQM values for the service classes instead of service queue configurations, because the service queue configuration can be implemented in several different ways in the backbone and the access links of a WAN.

Different embodiments have different uses for the PQM values computed for the different service classes. For instance, some embodiments use the sub-path PQM values to generate sub-path usability state values (i.e., service class usability state values). In some embodiments, the path usability state values include an operational state signifying that the service class is operational, a degraded state signifying that the service class is congested or for some other reason is not providing the desirable service level, and a failed state signifying that the service class is not operational and should not be used.

To generate the usability state value for each service class, the method of some embodiments compares one or more PQM values for the service class with one or more threshold values that are specified (e.g., by a network administrator) for the service class, and designates the service class as degraded or failed when the PQM values do not meet their respective threshold values (e.g., are not below their threshold values). In some embodiments, a PQM value type has one threshold for marking the service class as degraded and another threshold for marking the service class as failed. Some embodiments compute a blended score (e.g., a weighted sum) from two or more PQM values for a service class, and compare this blended score with two threshold values to determine whether the service class should be designated as failed or degraded.

When a service class is designated as failed, the packet-transmitting forwarding node in some embodiments does not use the service class and generates an alert (e.g., a notification email, text, or other report) to network administrator that the network connection for the service class should be examined. When the service class is designated as degraded, the forwarding node in some embodiments does not use the service class in some embodiments, while in other embodiments the forwarding node uses this service class for fewer packets that it transmits through the network link.

Also, when the service class is degraded, the forwarding node in some embodiments generates an alert (e.g., a notification email, text, or other report) to network administrator that the network connection for the service class should be examined. However, irrespective of whether one service class is designated as failed or degraded, some embodiments continue using one or more other operational service classes that are associated with the network link (i.e., one or more service classes that have an operational state). This is because the maintenance of operational states for all the service classes of a QoS aware network link, allows one or more service classes of a network link to remain fully operational even through one or more service classes are designated as failed or degraded.

Some embodiments use the sub-path PQM values to distribute egress traffic from a forwarding node to different network links. To do this distribution for a received packet associated with a particular service class at a first forwarding node that has at least first and second network links that connect the node to the WAN, the method of some embodiments retrieves first and second path quantifying metric (PQM) values for the particular service class of the first and second network links.

Based on the first and second PQM values, the method selects one of the network links, (e.g., the first network link) for the packet, and then forwards the packet along the particular service class of the selected network link (e.g., the first network link). To forward the packet along the particular service class of the selected network link, the method associates the packet with the sequence number for the particular service class of the selected network link. Some embodiments perform the packet distribution among the network links on a per packet basis, while other embodiments perform this packet distribution on a per flow basis.

For the received packet, the method of some embodiments initially identifies the service class associated with the packet. The method in some embodiments performs this identification through a classification operation (e.g., through a match operation that matches the packet header values with an identifier of a classification rule that provides the service class), while in other embodiments identifies the packet's service class through service class identifier that is contained in a header of the packet or otherwise specified for the packet by another element in the network.

In some embodiments, a forwarding node connects to the WAN through multiple network links, two or more of which have several service classes with each class having its own set of one or more PQM values. Hence, to select the network link for a packet that is associated with the particular service class, the method in some embodiments identifies a set of one or more PQM values associated with the particular service class for each of the first and second network links, and then selects the network link that has the best PQM value set (e.g., the smallest PQM loss or delay value) for the particular service class.

Different types of PQM values are important for different packet flows. Hence, in some embodiments, the method selects a network link for the packet by selecting the PQM value type that is most important to the packet's flow, and then using this type's PQM values of the particular class to select the network link with the "best" PQM value. In other embodiments, the method computes a blended score (e.g., a weighted sum) from two or more PQM values of each network link in order to identify the network link with the best blended score as the network link for the received packet.

Instead of just picking the network link that offers the best PQM value or set of PQM values for a received packet associated with a particular service class, some embodiments perform a load balancing operation to distribute the load across two or more network links that offer the particular service class. This load balancing operation in some embodiments relies on load balancing criteria that are computed based on the PQM values that are computed for the particular service class for the two or more service classes.

The load balancing criteria in some embodiments are weight values that are computed based on the PQM values. In some embodiments, the weight values are also computed based on the depth of queues used to temporarily store packets before they are transmitted by the schedulers of the forwarding nodes. The load balancing operation in some embodiments can be performed on a per-flow basis or per-packet basis. When performed on a per-packet basis, the packets of one flow can be split in two or more streams that are sent along two or more network links that offer the desired service class for the packet. This increases the egress rate of the forwarding node for the flow as it allows the flow's packets to use the available throughput of multiple network links that offer the QoS for the particular service class.

Instead of using static service class assignments based on classification rules or service class identifications in packet headers, some embodiments dynamically select a service class for a packet by analyzing the PQM values computed for the service classes and selecting the service class that offers the best PQM value(s) at the time that the packet is being processed by the forwarding node. To dynamically select the service class for a packet, the method of some embodiments retrieves at least two PQM values (called first and second PQM values) respectively for at least two service classes (called first and second service classes below) associated with a network link.

The method then selects for the packet the service class (e.g., the first service class) that has the best retrieved PQM value. The method next associates the packet with the selected service class, and forwards the packet with the associated selected service class to another forwarding node along the network link. To associate the packet with the selected service class, the method in some embodiments associates the packet with the identifier of the selected service class (e.g., its DSCP tag) and/or the sequence number for the selected service class.

The dynamic selection and association of a service class for a packet allows packets of a critical application to always use service classes that provide the best PQM values at any given time. In some embodiments, the dynamic selection of the service class can be based on the type of PQM value that is most important to the critical application. For instance, only a minimal level of jitter might be acceptable for a particular application. Hence, for this application, the method of some embodiments uses the computed jitter values of the service classes of a network link to select one service class for the packets of the particular application. In this manner, the dynamic selection of the service classes can itself be a function of the application type. Instead of dynamically selecting and associating a service class on a per-packet basis, other embodiments dynamically select and associate a service class on a per-flow basis. Some of these embodiments perform this dynamic selection and association when processing the first packet of the flow.

The service class PQM values provide one manner for evaluating the state of each service class of a QoS aware network link. Service-class (SC) monitoring messages provide another way for evaluating the service class operational states. The SC monitoring messages in some embodiments are liveness messages (also called heartbeat messages) exchanged between two forwarding nodes for each service class on a QoS aware network link (i.e., on a network link with multiple service classes).

When it is desirable to reduce the amount of monitoring messages in the WAN, some embodiments use SC monitoring messages only for a subset of the service classes of a network link, while assessing quality of one or more other service classes of the network link by using the PQM values maintained at the second forwarding node for the other service classes. The subset of service classes in some embodiments are the critical service classes that are used to forward packets of critical application.

Some embodiments use both SC monitoring messages and PQM values to assess the state of a service class because the two different mechanisms have different strengths and weaknesses. The SC monitoring messages offer a fast way of detecting the degradation or failure of a service class. However, the SC monitoring messages in some cases might not detect all undesirable performance characteristics of a service class. For such situations, the PQM values are useful in detecting the service class degradation or failure.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
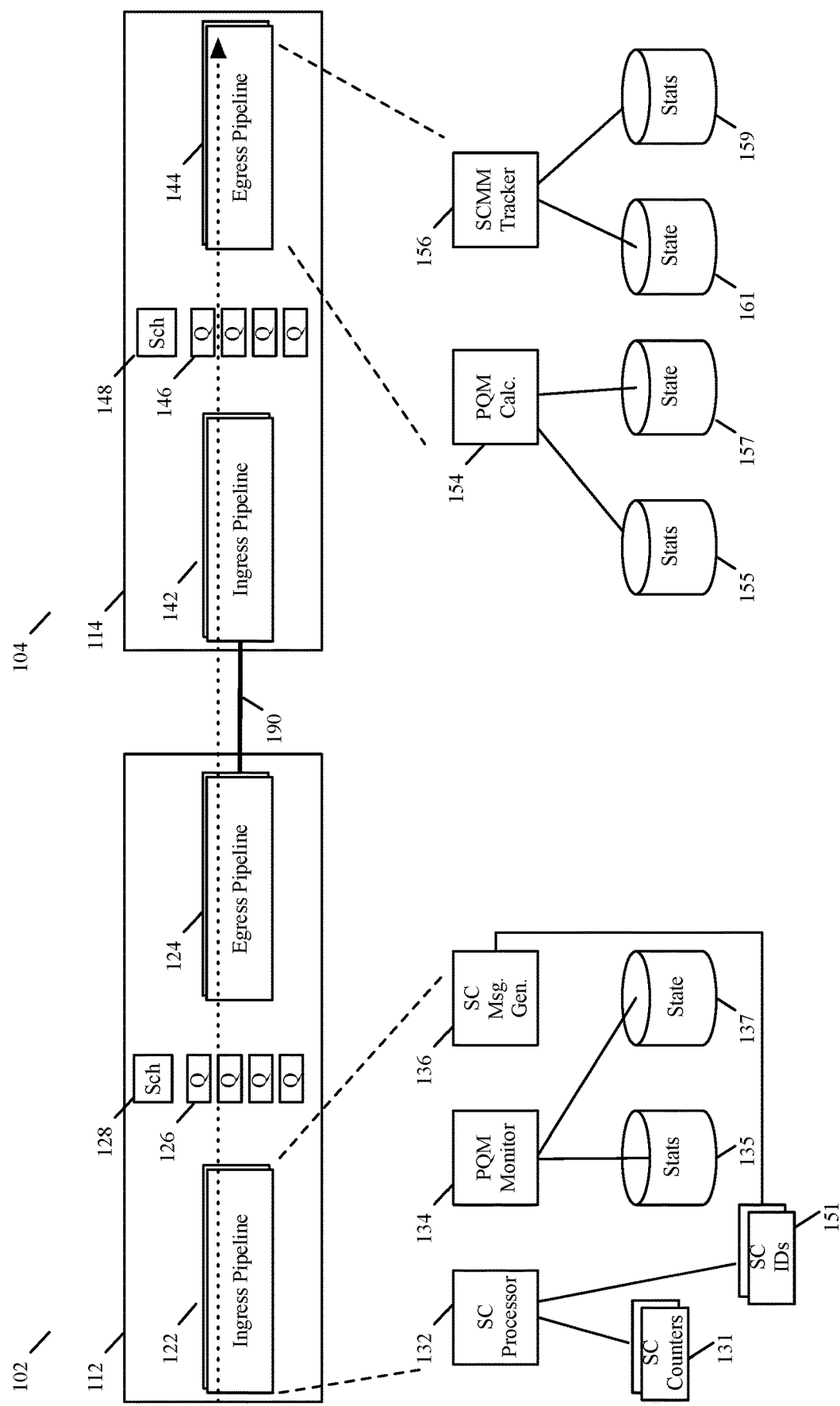
FIG. 1 conceptually illustrates the components of two WAN forwarding nodes that independently treat each service class in a multi-class link between the two forwarding nodes.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide methods for improving the use of the service classes provided by a link between first and second forwarding nodes in a wide area network (WAN). The different service classes in some embodiments are associated with different quality of service (QoS) guarantees that the WAN offers to the packets. Examples of such guarantees include throughput, uptime reliability, etc. A network link with two or more service classes is referred to below as a QoS aware link.

To improve the usage of a QoS aware link with multiple service classes, some embodiments treat each service class as an independent logical sub-path of the path that the network link establishes between the first and second forwarding nodes. For instance, when one service class has failed or is degraded, the forwarding nodes can eliminate or reduce their use of this service class while continuing to use the other service classes offered by the network link.

To treat each service class of a multi-class link as its own independent logical sub-path, some embodiments compute path quality metric (PQM) values for each independent service class and use service-class (SC) monitoring messages (also called liveness or heartbeat messages in this document) for each independent service class. Some embodiments facilitate the computation of PQM values and the exchange of SC-monitoring messages by associating the packets transmitted for each service class with a set of sequence numbers that are unique to the service class, and associating the SC-monitoring messages with different service class identifiers.

As used in this document, QoS aware links are wired or wireless WAN links that treat packets differently based on unique identifiers associated with the packets. Unique identifier for a packet can be a value computed from the packet or carried in the packet header itself. Based on the unique identifiers, packets can be put in different scheduling queue, rate-limited/policed with different bandwidth capacities, and/or applied with different drop policies. An example of one such link is MPLS. MPLS links provide different class of service that is assigned based on the DSCP tag carried in the packet. The class of service policy is applied in every transit device in the QoS Aware path connecting between two WAN endpoints (e.g., two edge forwarding nodes of an SD-WAN).

Service classes are a set of classes that the QoS aware links support. In the case of MPLS, it supports 8 classes. Service queues are number of scheduler queues that a QoS aware link uses. The service classes are assigned to the service queues. A transit QoS device or node is an upstream networking device or node that applies the QoS policies to make the path a QoS aware one. It can be the next hop or could be a transit device in the backbone that connect the two WAN edge endpoints. In MPLS world, this can be a provider edge or provider MPLS router.

WAN edge node is a network device that acts as a gateway to the Internet and other WAN edge nodes. It can be located in a branch or headquarters (hub) or in cloud or as a gateway in public or private cloud. A path between two WAN edge nodes represents end-to-end connectivity between the two nodes. When there are multiple destination endpoints, there can be more than one path made from the same link.

A WAN edge node can have multiple WAN links available for communicating to other WAN edges nodes or to the Internet. It is possible that one or more of those links can have QoS Awareness and other could be generally available public broadband links (non QoS aware). The ability of the WAN solution to make best use of the heterogenous link types on a WAN edge node is further referred as hybrid WAN link support.

FIG. 1 presents a conceptual illustration of the components of two WAN forwarding nodes 102 and 104 that independently treat each service class in a multi-class link 190 between the two forwarding nodes. These components treat the service classes independently by exchanging the SC-monitoring messages for each service class with the service class identifier, and associating the data packets forwarded by each service class with sequence numbers that are unique to that service class.

In some embodiments, the forwarding nodes 102 and 104 are part of a software-defined WAN (an SD-WAN) that is an overlay network established by using overlay network headers for the packets. The forwarding nodes of the SD-WAN in some embodiments use encapsulating tunnel headers to allow the packet's overlay network headers to be transparent to the underlay network fabric that the packets traverse. Also, the link 190 is a multi-service class link, such as an MPLS (multi-path label switching) link. In some embodiments, the SD-WAN that is established by the forwarding nodes 102 and 104 belongs to an enterprise or an entity with offices and/or datacenters. In some of these embodiments, examples of forwarding nodes 102 and 104 are edge and hub nodes deployed in branch offices, edge and hub nodes deployed in datacenters, and gateways deployed in private and public cloud datacenters.

In this example, each forwarding node 102 or 104 has similar transmit-side components 112 and receive-side components 114. To keep the illustration simple, only the transmit-side components 112 of the forwarding node 102 and the receive-side components 114 of the forwarding node 104 are shown in FIG. 1. Also, in some embodiments, the transmit-side processing and the receive-side processing of the forwarding node are performed by the same set of components.

The transmit- and receive-side components have different software implementations (e.g., open virtual switch, open flow, virtual router, etc.) and/or hardware implementations (e.g., hardware forwarding ASICs offered by such companies as Broadcom and Intel), on computers and/or stand-alone network appliances. In some embodiments, each forwarding node's components are implemented by one device (e.g., one computer or appliance), while in other embodiments each node's components are implemented by multiple devices (e.g., multiple computers).

The transmit-side components 112 of the forwarding node 102 include one or more ingress processing pipelines 122, one or more egress processing pipelines 124, several service-class queues 126 in between the ingress and egress processing pipelines, and schedulers 128 for the SC queues. In some embodiments that implement the forwarding node with a hardware ASIC, the processing pipelines of a forwarding node include one or more stages of match-action units that (1) perform match operations based on packet attributes (e.g., header values) and then (2) perform action operations on the packets based on the actions associated with the matching records. In some embodiments that implement the forwarding node as a software forwarding node, the processing pipelines are implemented fully or partially by match-action operations performed by one or more software forwarding elements (e.g., switches, routers, etc.).

As shown in FIG. 1, the ingress packet processing pipeline 122 on the transmit-side components 112 in some embodiments implement a service class processor 132, a PQM monitor 134, and SC message generator 136. One or more of these three components 132, 134 and 136 in other embodiments are implemented as part of the egress processing pipeline 124 of the transmit-side component 112. The illustration in FIG. 1 offers just one example of an implementation of the transmit- and receive-side components of a forwarding node in an SD-WAN of some embodiments.

In some embodiments, the SC processor 132 identifies the service classes associated with the packets. In some embodiments, the SC processor can be configured to identify the service classes for the packets based on one or more techniques. For instance, in one embodiment, the SC processor identifies the packet's service class through the service class identifier that is contained in a header of the packet, or otherwise specified for the packet, by another element in the network.

Conjunctively, or alternatively, the SC processor in some embodiments performs a classification operation that matches the packet header values with an identifier of a classification rule that provides the service class. In some embodiments, some match-action rules include (1) match identifiers that have header values associated with high priority applications (e.g., IP addresses or port addresses of high priority applications), and (2) action identifiers that provide identifiers of high priority service classes to use for the high priority applications, while other match-action rules include (1) match identifiers that have header values associated with low priority applications (e.g., IP addresses or port addresses of low priority applications), and (2) action identifiers that provide identifiers of low priority service classes to use for the low priority applications. In still other embodiments, the SC processor 132 dynamically selects the service class for a packet or flow, as further described below.

After identifying a service class for a packet, the SC processor 132 associates the packet with the identifier of the identified service class and with a sequence number from a range of sequence numbers used for the identified service class. FIG. 1 illustrates the SC processor 132 using different sequence number counters to obtain different sequence numbers for packets of different service classes. In some embodiments, each SC counter 131 maintains a current packet count for each service class, and increments this count as it provides the next sequence number for a service class to the SC processor 132. FIG. 1 also illustrates a list 151 of service class identifiers that identify the different service classes, and the SC processor's use of this list.

As mentioned above, some embodiments use different sets of sequence numbers for the service classes to differentiate the different service classes (i.e., to treat the different service classes as different logical sub-paths). In some embodiments, each service class has a sequence number range (called the primary sequence number range) that is formed by an identifier of the service class plus another sequence number range (called the secondary sequence number range). The different service classes in some embodiments can use the same secondary sequence number range as their primary sequence number range because of their different service class identifiers. In some SD-WAN embodiments that use MPLS, the service class identifier is the DSCP (differentiated service code point) tag associated with the service class. In other embodiments that use MPLS, the service class identifiers are not the DSCP tags.

During the packet processing in the ingress and/or egress pipelines, some embodiments tag the packet with the service class identifier and the sequence number, which in some embodiments is just a sequence number from the secondary sequence number range mentioned above that is made into a unique sequence number by combining it with the service class identifier. When the packet is transmitted to the other forwarding node, its associated service class identifier and sequence number are inserted in the header (e.g., the overlay network header, an encapsulating header or an MPLS header) of the packet.

The PQM monitor 134 maintains in a statistic storage 135 the PQM values that it receives for each service class from the receive-side PQM calculator 154, which will be described below. Examples of these metrics include packet loss, delay and jitter for each service class. In some embodiments, the PQM monitor 134 uses the service class PQM values (also called sub-path PQM values) to generate service class usability state values (i.e., sub-path usability state values) that it stores in a state storage 137. In other embodiments, the PQM monitor 134 receives these usability state values from the receive-side PQM calculator 154.

In some embodiments, the path usability state values include an operational state signifying that the service class is operational, a degraded state signifying that the service class is congested or for some other reason is not providing the desirable service level, and a failed state signifying that the service class is not operational and should not be used. To generate the usability state value for each service class, the PQM monitor 134 (or the PQM calculator 154) of some embodiments compares one or more PQM values for the service class with one or more threshold values that are specified (e.g., by a network administrator) for the service class, and designates the service class as degraded or failed when the PQM values do not meet their respective threshold values (e.g., are not below their threshold values).

In some embodiments, a PQM value type has one threshold for marking the service class as degraded and another threshold for marking the service class as failed. Some embodiments compute a blended score (e.g., a weighted sum) from two or more PQM values for a service class, and compare this blended score with two threshold values to determine whether the service class should be designated as failed or degraded. For instance, in some embodiments, the PQM monitor 134 (or the PQM calculator 154) computes a weighted sum of the loss, delay and jitter values for a service class and then compares this sum with two threshold values for the service class, in order to determine whether the service class should be designated as failed or degraded. The weighted sum in some embodiments is computed by multiplying the different PQM values (e.g., loss, delay and jitter) with different weights before summing the result of the multiplications.

When a service class is designated as failed, the packet-transmitting forwarding node in some embodiments does not use the service class and generates an alert (e.g., a notification email, text, or other report) to network administrator that the network connection for the service class should be examined. When the service class is designated as degraded, the forwarding node in some embodiments does not use the service class in some embodiments, while in other embodiments the forwarding node uses this service class for fewer packets that it transmits through the network link.

Also, when the service class is degraded, the forwarding node in some embodiments generates an alert (e.g., a notification email, text, or other report) to network administrator that the network connection for the service class should be examined. For instance, in some embodiments, the service class processor 132 accesses the service class usability states and reduces or eliminates associating packets to service classes that have degraded or failed usability states. However, irrespective of whether one service class is designated as failed or degraded, the forwarding nodes in some embodiments continues using one or more other operational service classes that are associated with the network link (i.e., one or more service classes that have an operational state). This is because the maintenance of operational states for all the service classes of a QoS aware network link, allows one or more service classes of a network link to remain fully operational even through one or more service classes are designated as failed or degraded.

The service class PQM values provide one manner for evaluating the state of each service class of a QoS aware network link. Service-class (SC) monitoring messages provide another way for evaluating the service class operational states. The SC monitoring messages in some embodiments are liveness messages (also called heartbeat messages) exchanged between two forwarding nodes for each service class on a QoS aware network link (i.e., on a network link with multiple service classes).

In some embodiments, the SC monitoring message (SCMM) generator 136 of the transmit-side forwarding node component 112 periodically generates SC monitoring message for each service class, and associates each service class' monitoring messages with the identifier of the service class. These messages are then sent from the transmit-side forwarding node to the other node, which, as described below, has a SCMM tracker 156 that generates state values for the service classes based on loss values that it tracks for monitoring messages of the service classes.

After the transmit-side ingress-pipeline processing for a packet is completed in the example illustrated in FIG. 1, the packet is stored in a service queue 126 associated with the service class identified for the packet. Packets are read out of the service queues 126 based on egress rates specified by the schedulers 128 for these queues. In some embodiments, each service class' scheduler specifies a rate that is commensurate with the QoS metrics associated with the service class. The duration that a packet stays in the service queue for its service class depends not only on the egress rate specified by the queue's scheduler but also based on the queue's congestion (i.e., the number of earlier packets in the queue).

When the transmit-side forwarding node includes a forwarding ASIC, the service queues in some embodiments are part of a cross bar switching fabric between the different ingress and egress pipelines. In other embodiments, the service queues are storage locations in the forwarding elements memory. For instance, when the transmit-side forwarding node is a software forwarding element executing on a computer, the service queues are storage locations in the computer's memory in some embodiments or queues of a network interface controller (NIC) of the computer in other embodiments. While the example presented in FIG. 1 illustrates service queues on the transmit-side forwarding node, other embodiments do not employ service queues on the transmit-side of a WAN link, but only employ service queues on the receive-side of the WAN link in order to enforce the QoS metrics for a service class.

In the example illustrated in FIG. 1, a packet is processed by one or more packet-processing stages or operations of an egress pipeline once the packet exits its service queue. When the transmit-side forwarding node includes a forwarding ASIC, the packet in some embodiments is processed by the egress pipeline associated with the port from which the packet is supposed to exit the forwarding ASIC. This port is associated with a port of the forwarding element that includes the forwarding ASIC. When the transmit-side forwarding node is a software forwarding element executing on a computer, the packet is processed by one or more modules or circuits of the computer in order to have the packet exit the computer's NIC.

In some embodiments, the egress-side processing of the transmitting forwarding node does not entail many operations other than the operations needed to direct the packet to the port or NIC for egressing the node. Alternatively, in some embodiments, one or more of the ingress-side operations (such as SCMM generator) are implemented by the egress processing pipelines of the transmitting forwarding node.

In the example illustrated in FIG. 1, the two forwarding nodes 102 and 104 are connected through the QoS aware link 190 (e.g., an MPLS link, etc.). This QoS aware link has multiple associated service classes. This link serves as one layer 1 physical connection (one L1 physical network connection circuit) for one or both forwarding nodes. In some embodiments, one of the forwarding nodes can connect to this link through other network links, but one of the forwarding nodes connects directly to this link. Also, in some embodiments, one or more IP addresses can be associated with this link 190.

The receive-side components 114 of the forwarding node 104 receives a packet sent by the forwarding node 102 along a particular service class. Like the transmit-side components 112, the receive-side components include one or more ingress processing pipelines 142, one or more egress processing pipelines 144, several service-class queues 146 in between the ingress and egress processing pipelines, and schedulers 148 for the SC queues. Again, when the forwarding node 104 is implemented with a hardware ASIC, its processing pipelines include one or more stages of match-action units, as described above. Alternatively, when the forwarding node is a software forwarding node, the processing pipelines are implemented fully or partially by match-action operations performed by one or more software forwarding elements (e.g., switches, routers, etc.).

An ingress processing pipeline 142 processes a packet received by the forwarding node 104, identifies the service class associated with this packet (e.g., from a service class identifier that is inserted in the received packet's header), and specifies a service queue 146 for the identified service class to store the received packet. Packets are read out of the service queues 146 based on egress rates specified by the schedulers 148 for these queues. In some embodiments, each service class' scheduler 148 specifies a rate that is commensurate with the QoS metrics associated with the service class. The duration that a packet stays in the service queue for its service class depends not only on the egress rate specified by the queue's scheduler but also based on the queue's congestion (i.e., the number of earlier packets in the queue).

When the receive-side forwarding node includes a forwarding ASIC, the service queues in some embodiments are part of a cross bar switching fabric between the different ingress and egress pipelines. Alternatively, when the receive-side forwarding node is a software forwarding element executing on a computer, the service queues are storage locations in the computer's memory in some embodiments.

When the packet exits its service queue 146, the packet is processed by one or more packet-processing stages or operations of an egress pipeline 144. As shown in FIG. 1, the egress packet processing pipeline 144 on the receive-side components 114 in some embodiments implement a PQM calculator 154 and an SCMM tracker 156. The illustration in FIG. 1 offers just one example of an implementation of the transmit- and receive-side components of a forwarding node in an SD-WAN of some embodiments. In other embodiments, these components 154 and 156 can be implemented differently, e.g., the SC message monitor 156 in some embodiments is implemented in the ingress processing pipeline 142.

The PQM calculator 154 calculates PQM values that quantify the quality of two or more service classes provided by the link 190 between the forwarding nodes 102 and 104. The PQM calculator 154 stores the calculated PQM values in metric storage 155. In some embodiments, the computed PQM value for each service class quantifies the QoS provided to packets processed through the service class (e.g., through the service queues of the service class). In some embodiments, the PQM calculator 154 adjusts the PQM values as it processes more packets associated with the service classes. The PQM calculator 154 also periodically forwards to the forwarding node 102 the PQM values that it maintains for the service classes.

In some embodiments, the forwarding node 102 performs a similar set of operations to compute PQM values for packets sent by the forwarding node 104 for the different service classes, and to provide these PQM values to the forwarding node 104 periodically. As further described below, each forwarding node uses the PQM values received by the other forwarding node to assess the quality of the service classes of the link 190 for forwarding data messages to the other forwarding node.

The PQM calculator 154 compute different PQM values in different embodiments. For instance, for each service class, the PQM calculator in some embodiments computes packet loss, delay and jitter as three PQM values for the service class. To compute PQM values for each service class, a PQM calculator uses the sequence numbers associated with the packets to differentiate the service classes associated with the packets. For example, to compute packet loss for a service class, the PQM calculator in some embodiments uses the sequence numbers of the service classes to maintain counts of packets that are not received timely and sequentially, and uses the time average of this count as the average packet loss for the service class.

To compute the packet delay for the service class, the PQM calculator 154 in some embodiments computes (1) a delay value for each packet by computing a difference between a time stamp contained in the packet's header and the time the forwarding node 104 received the packet, or a difference between a time stamp contained in the packet's header and the time the packet was read out of its service queue 146 and supplied to the egress pipeline 144, and (2) averages this delay with other delay values it computed for packets associated with the same service class. Again, the PQM calculator 154 identifies the packets associated with the same service class based on the packet sequence numbers that are associated with the service class. The PQM calculator 154 in some embodiments computes the packet jitter as a derivative of the packet delay values that it computes (i.e., based on the rate of change of the delay value).

In some embodiments, the PQM calculator 154 identifies a state value (e.g., an operational value, a degraded value, or a failed value) for each service class based on the PQM values that it computes for the service class, and stores these values in state storage 157. It identifies these state values using one or more of the techniques that were described above for the PQM monitor 134 maintaining these values. In some embodiments, the PQM calculator 154 periodically provides the state values that maintains for the service classes to the PQM monitor 134, while in other embodiments, it provides these state values to the monitor 134 each time there is a change of state to one of the service classes.

The SCMM tracker 156 also maintains statistics in a stat storage 159 and states in a state storage 161 regarding the health of a service class. In addition to the set of SC state values generated by the PQM calculator 154, the SCMM tracker 156 generates another set of SC state values for each service class for which the SC message monitor 136 sends SC monitoring messages. This tracker's set of state values are based on loss values that the tracker maintains in its state storage 161 for SC monitoring messages that it processes for each service class. As mentioned above, it tracks each service class' SC monitoring messages based on the service identifier associated with these messages. In some embodiments, the SCMM tracker 156 periodically checks to make sure that it has received a SC monitoring message from the SCMM generator 136 once every configurable time period. If it detects that it has not received an SC monitoring message for N (e.g., 3) consecutive time periods for a service class, it changes the state of service class to degraded, and then changes the state to failed when it detects that it has not received an SC monitoring message for M (e.g., 7) consecutive time periods for the service class.

When a first forwarding node informs a second forwarding node that a service class has degraded or has failed (e.g., as determined by the first forwarding node's PQM calculations or SCMM tracking), the second forwarding node reduces or eliminates its use of the service class. Also, in such a case, one or both of the forwarding nodes generates a notification (e.g., sends one or more notification packets) to another forwarding node, a server, or a controller to provide notification of the degradation or failure of a service class.

When it is desirable to reduce the amount of monitoring messages in the WAN, some embodiments use SC monitoring messages only for a subset of the service classes of a network link, while assessing quality of one or more other service classes of the network link by using the PQM values maintained at the second forwarding node for the other service classes. The subset of service classes in some embodiments are the critical service classes that are used to forward packets of critical application.

Some embodiments use both SC monitoring messages and PQM values to assess the state of a service class because the two different mechanisms have different strengths and weaknesses. The SC monitoring messages offer a fast way of detecting the degradation or failure of a service class. However, the SC monitoring messages in some cases might not detect all undesirable performance characteristics of a service class. For such situations, the PQM values are useful in detecting the service class degradation or failure.

Figure 2:
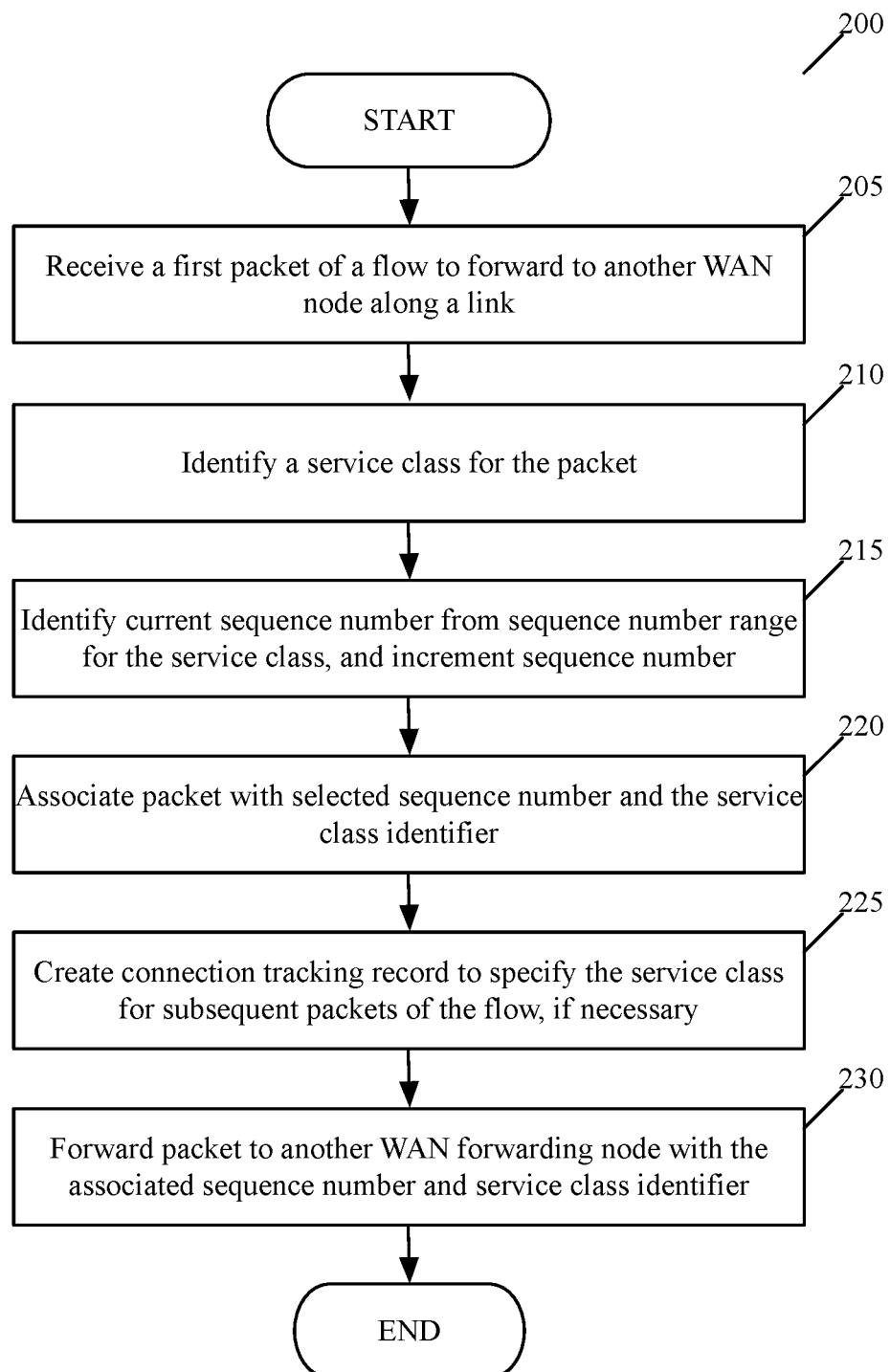
FIG. 2 illustrates a process that the transmit-side components of a forwarding node perform in some embodiments to associate a packet that it receives with a service class.

FIG. 2 illustrates a process 200 that the transmit-side components of a forwarding node perform in some embodiments to associate a packet that it receives with a service class. As shown, the process 200 starts (at 205) when it receives a packet to forward along a network link that connects its forwarding node to another forwarding node in the WAN. The received packet is a first packet of a flow. Next, at 210, the process 200 identifies the service class for the packet. The identified service class has an associated service class identifier that uniquely identifies the service class. In some SD-WAN embodiments that use MPLS, the service class identifier is the DSCP (differentiated service code point) tag associated with the service class. In other embodiments that use MPLS, the service class identifiers are not the DSCP tags.

In some embodiment, the process identifies the packet's service class through service class identifier that is contained in a header of the packet, or otherwise specified for the packet, by another element in the network. Alternatively, in some embodiments, the process 200 performs (at 210) a classification operation that matches the packet header values with a service classification rule that provides the service class identifier for the packet. For instance, in some embodiments, the classification operation matches the received packet's header values with the match identifier of a match-action rule. This rule has a corresponding action identifier that provides the identifier of the service class that should be associated with any packet that matches its corresponding match identifier. In some embodiments, different match-action rules include (1) match identifiers that have header values associated with different priority applications (e.g., IP addresses or port addresses of high priority applications), and (2) action identifiers that provide identifiers of different priority service classes to use for the different priority applications.

After identifying a service class for a packet, the process 200 identifies (at 215) a sequence number from a range of sequence numbers used for the identified service class. As mentioned above, the SC processor 132 in some embodiments uses different sequence number counters 131 to obtain different sequence numbers for packets of different service classes. In some embodiments, these counters produce counts in different ranges for the different service classes so that the different service classes can use different sequence numbers. In other embodiments, these counters produce counts in the same range, but different counts are generated for the different service classes. Moreover, in these embodiments, the generated count produced for each service class is combined with the service class identifier, or a unique number derived from the service class identifier, to specify a larger sequence number for the packet, in order to ensure that no two sequence numbers for two different service classes ever match.

Under either of the above-mentioned approaches, the process 200 selects the sequence number that the number counter for the identified service class has as the current sequence number for this class. The counter then increments this number for the next packet that it needs to process. In other embodiments, the service class' counter first increments the sequence number and then provides the incremented sequence number each time the SC processor 132 requests a sequence number for a packet that the SC processor is processing.

Next, at 220, the process 200 associates the packet with the identifier of the service class identified at 210 and the sequence number identified at 215. In some embodiments (e.g., those that perform classification operations to identify the service class for a packet), the process 200 creates (at 225) a record in a connection tracking table that specifies the service class identifier (obtained at 210) for the received packet's flow, so that this record can be used to quickly identify the service class for subsequent packets in the same flow. This record in some embodiments includes the flow's identifier (e.g., five tuple identifier) as its match attribute, and specifies the service class identifier in its action attribute.

At 230, the process 200 continues its processing and forwarding of the packet by using the service class identifier obtained at 210 and the sequence number identified at 215. For instance, during the packet processing in the ingress and/or egress pipelines, some embodiments tag the packet with the service class identifier and the sequence number. In some embodiments, the packet is also placed in the identified service class' service queue of the transmit-side forwarding element, and read out of this queue based on this queue's congestion and egress rate (which is determined by the QoS that the service class is configured to receive). When the packet is transmitted to the other forwarding node, its associated service class identifier and sequence number are inserted in the header (e.g., an overlay network header, an encapsulating header or an MPLS header) of the packet. After 230, the process 200 ends.

Figure 3:
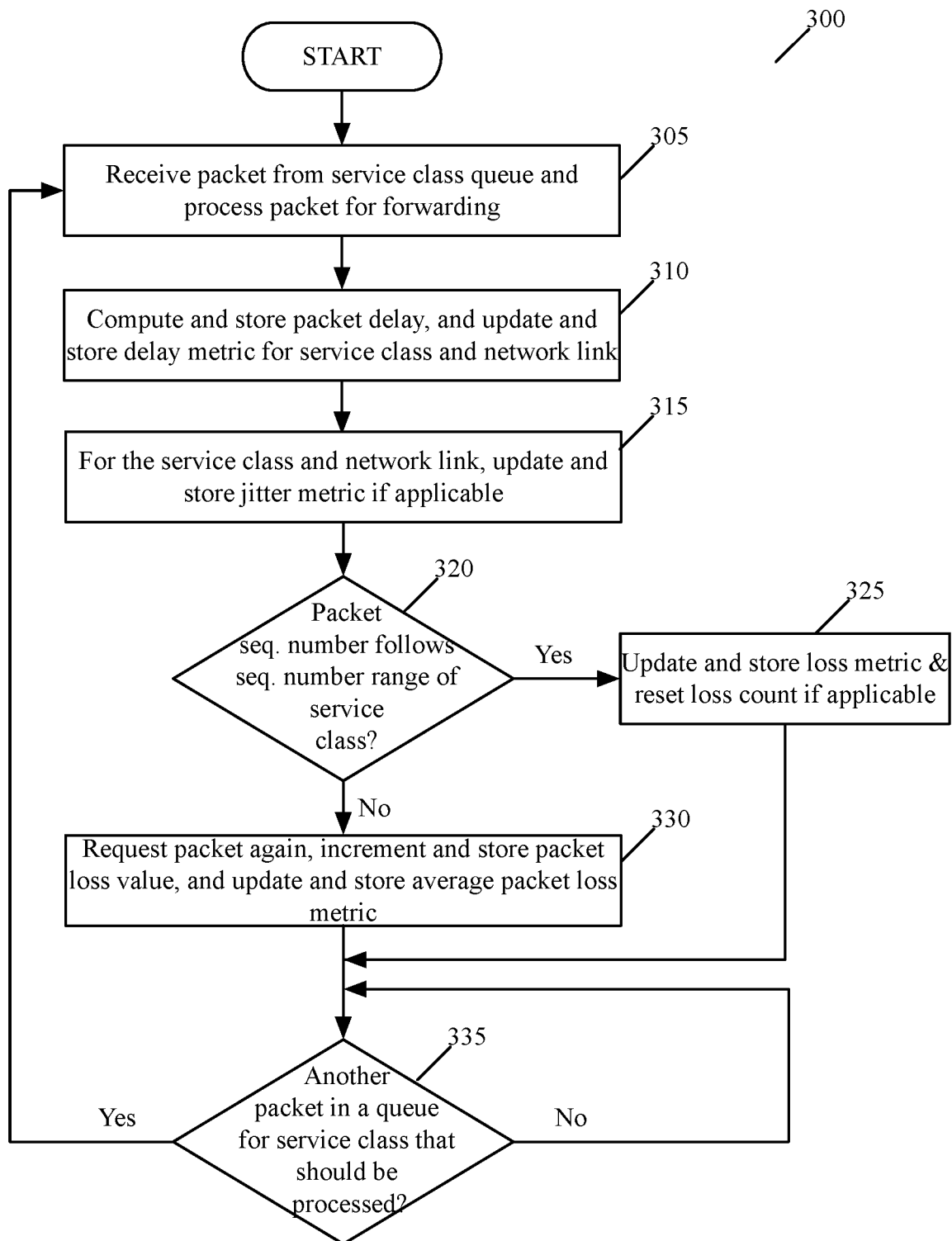
FIG. 3 illustrates a process that the receive-side components of a forwarding node perform in order to process a packet that is received for a service class of a QoS aware link.

FIG. 3 illustrates a process 300 that the receive-side components of a forwarding node perform in order to process a packet that is received for a service class of a QoS aware link. The process 300 starts when the packet is read out (at 305) of a service queue of the service class. Based on the configured QoS setting, a scheduler 148 for the service class in some embodiments determines the rate for packets to leave this service queue. This rate along with the congestion of the service queue will determine how fast a packet traverses through this queue.

Once the packet leaves its service queue, the PQM calculator 154 calculates PQM values that quantify the quality of service that this packet actually has received for its service class and link. In some embodiments, the PQM calculator 154 adjusts the PQM values as it processes more packets associated with the service classes. To compute PQM values for each service class, the PQM calculator uses the sequence numbers associated with the packets to differentiate the service classes associated with the packets.

The operations 310-330 illustrate one example of the computations that the PQM calculator 154 performs in some embodiments to compute the PQM values. To compute the packet's delay, the process 300 in some embodiments computes (at 310) a delay value for each packet by computing a difference between a time stamp contained in the packet's header and the time the forwarding node 104 received the packet, or a difference between a time stamp contained in the packet's header and the time the packet was read out of its service queue 146 and supplied to the egress pipeline 144.

The process 300 then uses this delay value to update the delay value that it stores for the packet's service class in the stat storage 155. In some embodiments, the process averages this delay with other delay values it computed for packets associated with the same service class. This average is a weighted average that is biased towards more recent measurements in some embodiments, while it is unweighted simple average in other embodiments. In some embodiments, the process maintains an average value and current packet count in the storage 155 so that it can produce an unweighted average by multiplying the average value with the current packet count, adding the value of the delay computed at 310 to this sum, and then dividing the sum by the current packet count plus one. In storing the new average in the stat storage 155 in these embodiments, the process increments the current packet count by one.

After computing and updating the delay values, the process 300 in some embodiments computes (at 315) the packet jitter as a derivative of the packet delay values that it has computed for the service class. This derivative is computed based on the rate of change of the computed delay values. In other embodiments, the jitter values are computed as a separate process that is performed periodically on delay values that the PQM calculator produces during different periods. In some embodiments, the process 300 updates the jitter value by maintaining several previously computed delay values and the current jitter value in the stat storage 155, while in other embodiments it updates the jitter value just from the current jitter value that it stores in the stat storage 155.

Next, at 320, the process determines whether the received packet has a sequence number that follows the previous sequence number of the previous packet that was processed for the service class. If not, the process 300 (at 330) requests the transmitting forwarding node to resend the packet, and then increments a packet loss value that it maintains for the service class in the stat storage 155. The process then updates (at 330) in this storage 155 the average packet loss value that it maintains for the service class based on the incremented packet loss value. After 330, the process transitions to 335.

When the process determines (at 320) that the received packet has a sequence number that follows the previous sequence number of the previous packet that was processed for the service class, the process transitions to 325, where it resets the packet loss count and updates the average packet loss value in the stat storage 155. From 325, the process transitions to 335. At 335, the process determines whether there is another packet in the service queue of the service class that is ready to be processed. If not, the process remains at 335, until the next packet is ready for processing, at which point the process returns to 305 and repeat its operations for this new packet.

Figure 4:
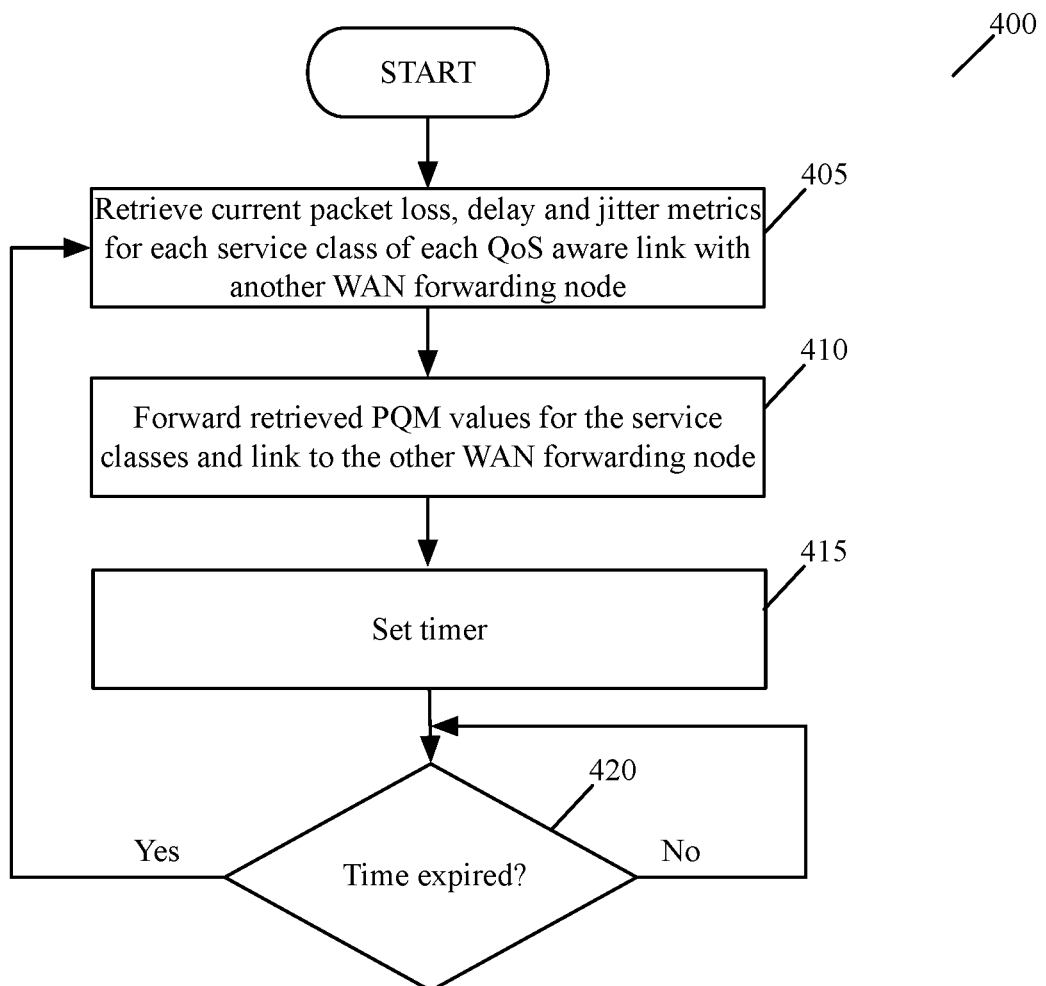
FIG. 4 illustrates a process that the PQM calculator of the receive-side components of a WAN forwarding node of some embodiment performs repeatedly.

FIG. 4 illustrates a process 400 that the PQM calculator 154 of the receive-side components of a WAN forwarding node of some embodiment performs repeatedly. The PQM calculator 154 performs the process 400 to periodically report to another WAN node the PQM values that it computes for each service class of each QoS aware link connecting its WAN node to the other WAN node. As shown, the process 400 starts by retrieving (at 405) the PQM values for each service class of each QoS aware links with another WAN forwarding node.

The retrieved PQM values in some embodiments are the values that the PQM calculator computes, stores and updates as it processes packets for the different service classes from the other WAN forwarding node (e.g., the PQM values that it computes in performing part of the process 300 of FIG. 3). In some embodiments, these PQM values include packet loss, delay and jitter values that are currently stored in the stat storage 155 for each service class of each QoS aware link that connects the PQM calculator's WAN node to the other WAN node.

Next, at 410, the process 400 forwards the retrieved PQM values to the other forwarding node. The PQM monitor 134 in the transmit-side components of the other forwarding node then store and analyze these values to derive one set of state values for each service class. In addition to deriving the state values, the PQM values are used by the other forwarding node in some embodiments to select links and/or service classes for packets and/or flows that it processes, as further described below.

At 415, the process 400 resets a timer that it uses to measure periods that it has to wait before reporting PQM values. After resetting this timer, the process waits (at 420) until the timer expires, at which point it returns to 405 to repeat its operations to report the next batch of PQM values for each service class of each QoS aware link connecting its WAN node to the other WAN node. The process 400 continuously performs these operations to continuously report PQM values to the other WAN node, while there is at least one operation QoS aware link connecting its WAN node to the other WAN node.

Figure 5:
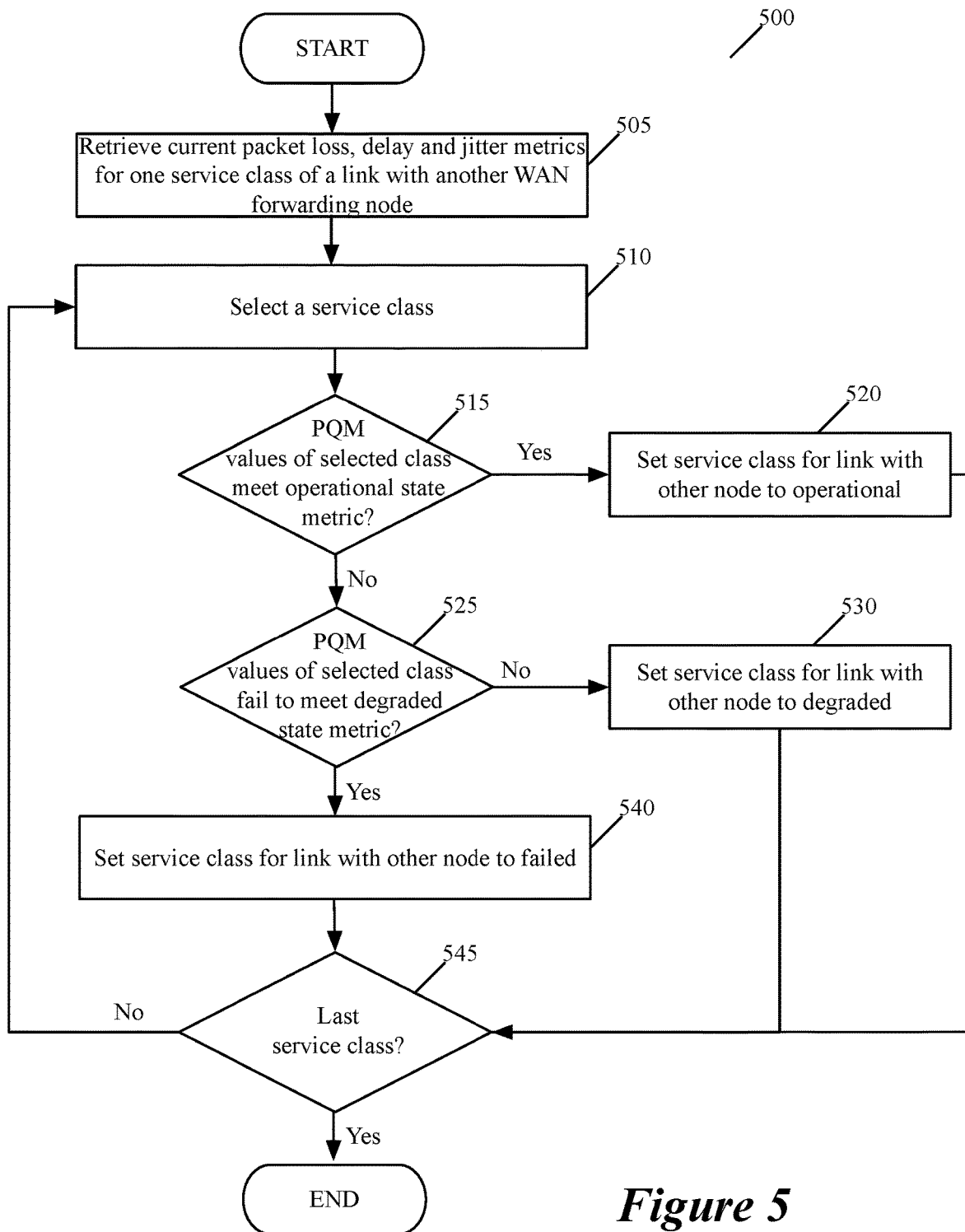
FIG. 5 illustrates a process that specifies state values for service classes of a QoS aware link between two WAN forwarding nodes.

FIG. 5 illustrates a process 500 that specifies state values for service classes of a QoS aware link between two WAN forwarding nodes. In some embodiments, the PQM monitor 134 of the transmit-side components of one forwarding node periodically performs this process based on PQM values reported by the PQM calculator 154 of the receive-side components of the other forwarding node. In other embodiments, the PQM calculator 154 of the receive-side components of a forwarding node periodically performs the process 500 and forwards the states that it computes to the other forwarding node.

In some embodiments, the service usability state values that the process 500 specifies include an operational state signifying that the service class is operational, a degraded state signifying that the service class is congested or for some other reason is not providing the desirable service level, and a failed state signifying that the service class is not operational and should not be used.

As shown, the process 500 starts by retrieving (at 505) a current set of PQM values for each service class of the QoS aware link with another WAN forwarding node. These PQM values in some embodiments are stored in transmit-side stat storage 135 or receive-side stat storage 155 depending on whether the PQM monitor 134 or the PQM calculator 154 is performing the process 500. The retrieved PQM values include packet lost, delay and jitter values that are currently stored in the stat storage 135 or 155 for each service class of the QoS aware link.

The process next selects (at 510) one of the service classes. To generate the usability state value for each service class, the process 500 in some embodiments compares one or more PQM values for the service class with one or more threshold values that are specified (e.g., by a network administrator) for the service class, and designates the service class as degraded or failed when the PQM values do not meet their respective threshold values (e.g., are not below their threshold values). In some embodiments, a PQM value type has one threshold for marking the service class as degraded and another threshold for marking the service class as failed. Some embodiments compute a blended score (e.g., a weighted sum) from two or more PQM values for a service class, and compare this blended score with two threshold values to determine whether the service class should be designated as failed or degraded.

Accordingly, the process compares (at 515) the set of retrieved PQM values for the selected service class with a first set of threshold values to determine whether the service class is operational. In some embodiments, the first set of threshold values includes a first threshold loss value, a first threshold delay value and a first threshold jitter value, and the selected service class' retrieved loss, delay and jitter values have to be less than their corresponding first threshold values for the process to deem the service class operational. In other embodiments, the process 500 computes a blended score (e.g., a weighted sum) from the packet loss, delay and jitter values for the selected service class, and compares this blended score with a first operational threshold value to determine whether it should designate service class as operational (e.g., the blended score is less than the first operational threshold).

When the process determines (at 515) that the service class is operational based on its comparison, it transitions to 520 to define the state of this service class as operational, and then transitions to 545, which will be described further below. On the other hand, when the process determines (at 515) that the retrieved PQM values do not meet the operational state threshold value(s), the process determines (at 525) whether the set of retrieved PQM values for the selected service class meet with degraded state threshold value(s).

To do this, the process compares (at 525) the set of retrieved PQM values for the selected service class with a second set of threshold values to determine whether the service class is operating in a degraded state. In some embodiments, the second set of threshold values includes a second threshold loss value, a second threshold delay value and a second threshold jitter value, and the selected service class' retrieved loss, delay and jitter values have to be less than their corresponding second threshold values for the process to deem the service class degraded. In other embodiments, the process 500 computes a blended score (e.g., a weighted sum) from the packet loss, delay and jitter values for the selected service class, and compares this blended score with a second operational threshold value to determine whether it should designate service class as degraded (e.g., the blended score is less than the second operational threshold).

When the process determines (at 525) that the service class is degraded based on its comparison, it transitions to 530 to define the state of this service class as degraded, and then transitions to 545. On the other hand, when the process determines (at 525) that the retrieved PQM values do not meet the degraded state threshold value(s), the process defines (at 540) the state of this service class to failed, and then transitions to 545. At 545, the process determines whether it has examined all the service classes for the link between the two forwarding nodes. If so, it ends. Otherwise, it returns to 510 to select another service class for the link.

When a service class is designated as failed, the packet-transmitting forwarding node in some embodiments does not use the service class and generates an alert (e.g., a notification email, text, or other report) to network administrator that the network connection for the service class should be examined. When the service class is designated as degraded, the forwarding node in some embodiments does not use the service class in some embodiments, while in other embodiments the forwarding node uses this service class for fewer packets that it transmits through the network link.

Also, when the service class is degraded, the forwarding node in some embodiments generates an alert (e.g., a notification email, text, or other report) to network administrator that the network connection for the service class should be examined. However, irrespective of whether one service class is designated as failed or degraded, some embodiments continue using one or more other operational service classes that are associated with the network link (i.e., one or more service classes that have an operational state). This is because the maintenance of operational states for all the service classes of a QoS aware network link, allows one or more service classes of a network link to remain fully operational even through one or more service classes are designated as failed or degraded.

In addition to using service class PQM values to compute one set of state values for each service class of a QoS aware network link, some embodiments use service-class (SC) monitoring messages to compute another set of state values for each service class of the QoS aware network link. Some embodiments use both SC monitoring messages and PQM values to assess the state of a service class because the two different mechanisms have different strengths and weaknesses. The SC monitoring messages offer a fast way of detecting the degradation or failure of a service class, but do not catch all degradation and failed conditions.

Figure 6:
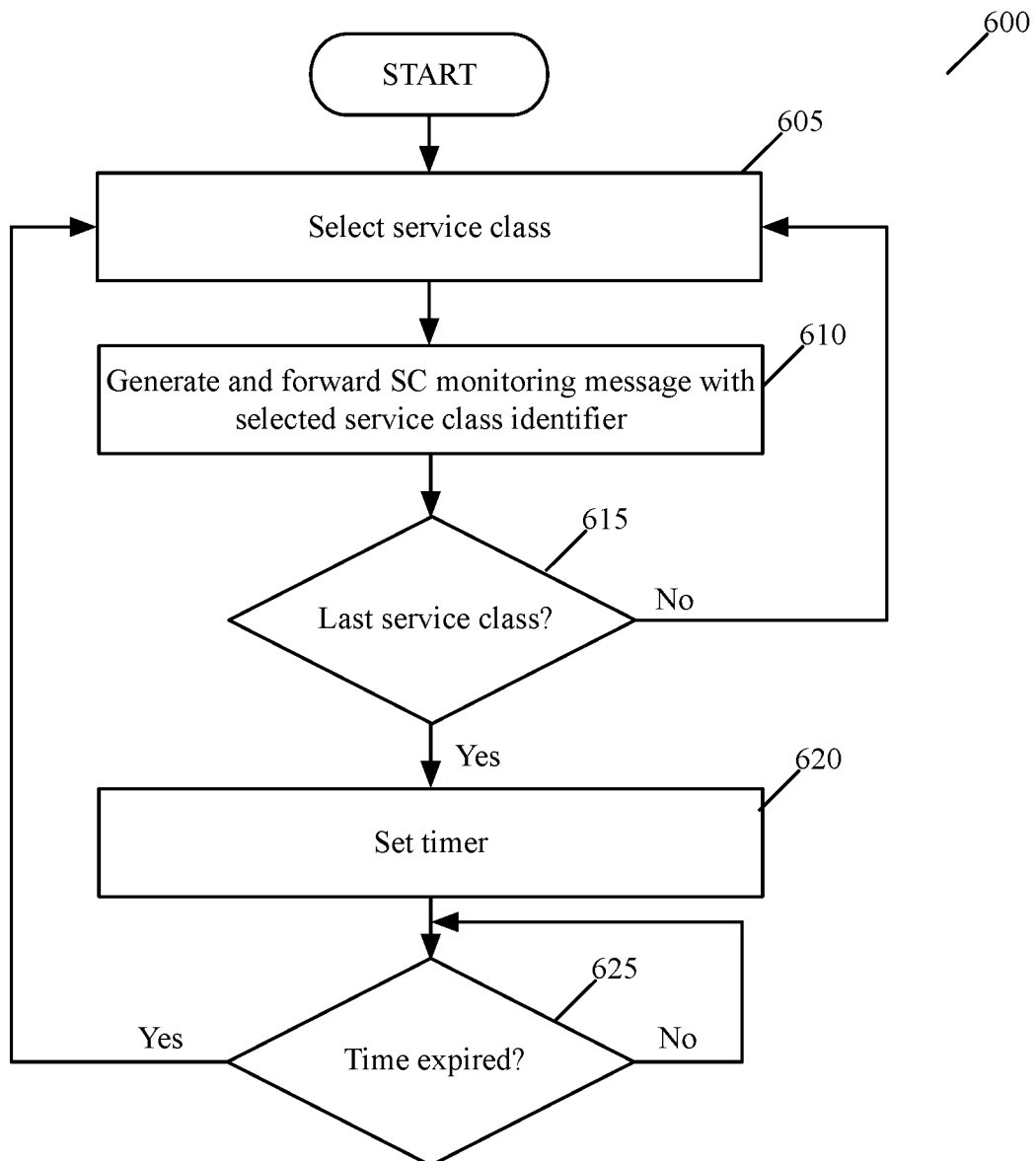
FIG. 6 illustrates a process that the SCMM generator of the transmit-side forwarding node component performs to periodically generate SC monitoring message for each service class.

FIG. 6 illustrates a process 600 that the SCMM generator 136 of the transmit-side forwarding node component 112 performs to periodically generate SC monitoring message for each service class. As shown, the process initially selects (at 605) one of the service classes. Next, at 610, it generates a SC monitoring message (e.g., a liveness or heartbeat ICMP pinging message) for the selected service class. The SC monitoring message in some embodiments is associated with the selected service class as it includes the identifier of the service class. The process sends (at 610) the generated SC monitoring message to the receive-side components 114 of the other forwarding link connected to the link 190.

At 615, the process 600 determines whether it has sent SC monitoring messages for each service class of the QoS aware link for which it has to send out SC monitoring messages. The process 600 sends SC monitoring messages for all the service classes of the link in some embodiments, while in other embodiments the process 600 sends SC monitoring messages for a subset of service classes (e.g. the critical service classes that are used to forward packets of critical application). As mentioned above, some embodiments reduce the amount of monitoring messages in the WAN, by using SC monitoring messages for only a subset of the service classes of a network link. These embodiments assess the quality of one or more other service classes of the network link by using just the PQM values generates for these services classes.

When the process determines (at 615) that it has not sent SC monitoring messages for each applicable service class, the process returns to 605 to select another service class and to generate and send (at 610) an SC monitoring message for this service class. When the process determines that it has sent SC monitoring messages for all the desired service classes, the process resets (at 620) a timer that it uses to send out SC monitoring messages.

After resetting this timer, the process waits (at 625) until the timer expires, at which point it returns to 605 to repeat its operations to send out the next batch of SC monitoring messages to the other forwarding node. The process 600 continuously performs these operations to continuously send SC monitoring messages to the other WAN node. In some embodiments, the process sends SC monitoring messages for the different service classes at different rates (e.g., based on different timers), or at the same rate but at different times so that the receiving forwarding node does not have to handle multiple SC monitoring messages for multiple service classes at one time.

Figure 7:
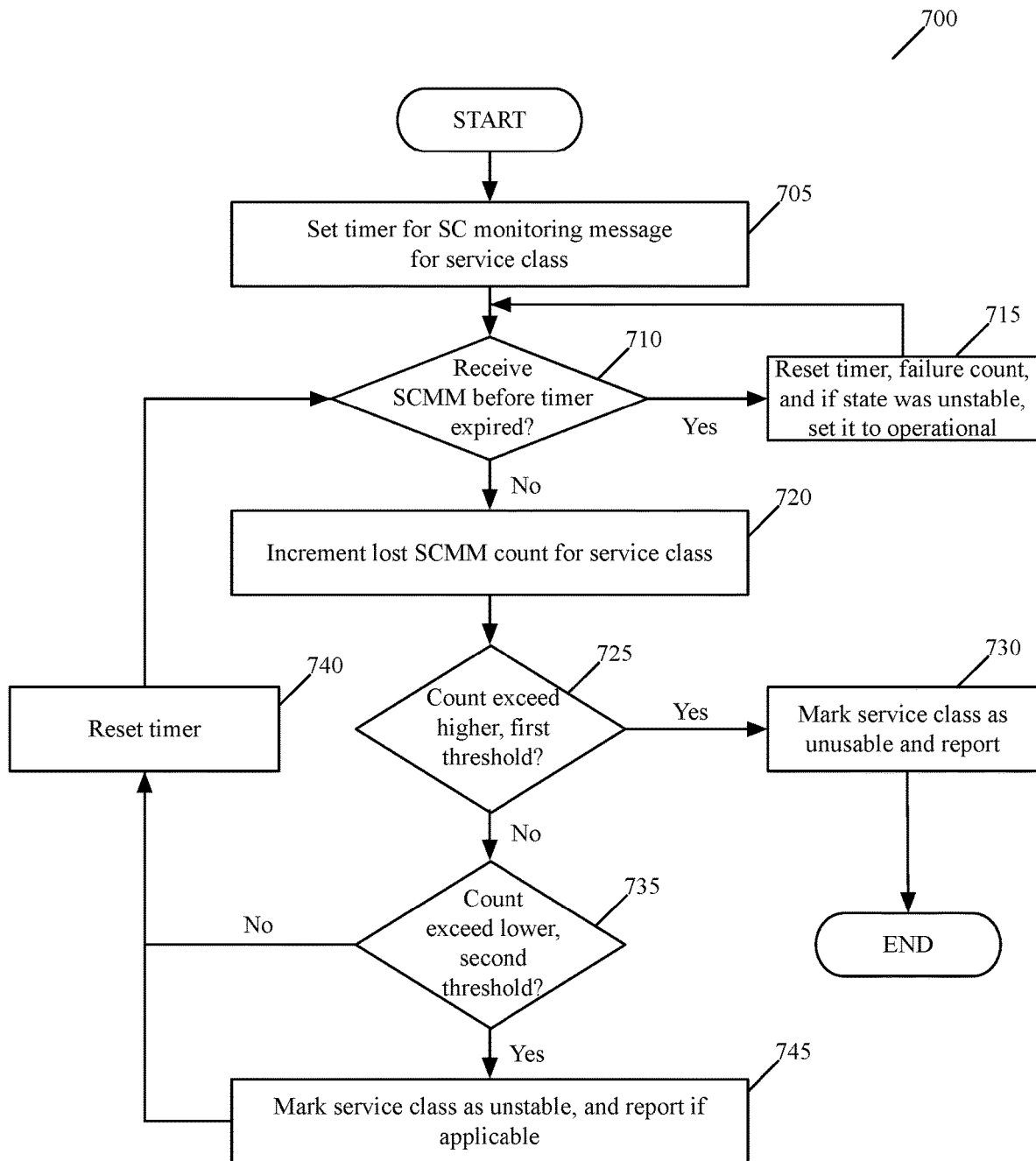
FIG. 7 illustrates a process that the SCMM tracker of the receive-side components of a forward node performs in some embodiments to process SC monitoring messages for a service class of a QoS aware link for which the SC message generator sends monitoring messages.

FIG. 7 illustrates a process 700 that the SCMM tracker 156 of the receive-side components 114 of a forward node performs in some embodiments to process SC monitoring messages for a service class of a QoS aware link for which the SC message generator 136 sends monitoring messages. In some embodiments, the SCMM tracker 156 maintains statistics and states regarding the health of each service class for which the SC message generator 136 sends monitoring messages. This tracker generates state values for each such service class based on loss values that it tracks for SC monitoring messages that it processes for the service class.

As shown, the process 700 initially sets (at 705) a timer (e.g., a 300 ms timer) for receiving a SC monitoring message for the service class. Next, at 710, the process determines whether it received the SC monitoring message for the service class before the timer expired. As mentioned above, the SCMM tracker 156 identifies each service class' SC monitoring messages based on the service identifier accompanying these messages (e.g., the service identifier stored in the overlay network or the encapsulating header of these messages).

When the timer expires (at 710) before the process receives the next SC monitoring message for the service class, the process 700 increments (at 720) a lost-SCMM count that it maintains for the service class in its stat storage 159. Next, at 725, the process determines whether the lost-SCMM count exceeds a higher, first threshold (e.g., 7). If so, the process marks (at 730) the service class as unusable, generates a message to the other forwarding node to identify this unusable state, generates another message to a controller or server to provide notification of the failed state of the service class, and then ends.

On the other hand, when the process determines (at 725) that the lost-SCMM count does not exceed the higher, first threshold, it determines (at 735) whether the lost-SCMM count exceeds a lower, second threshold (e.g., 3). If so, the process marks (at 745) the service class as unstable (i.e., degraded), generates a message to the other forwarding node to identify this unstable state, generates another message to a controller or server to provide notification of the degraded state of the service class, and then transitions to 740, which will be described below.

When the process determines (at 735) that the lost-SCMM count does not exceed the lower, second threshold, it transitions to 740. At 740, the process resets the timer for detecting the next SC monitoring message for the service class, and then returns to 710 to wait for the next SC monitoring message or the expiration of the timer. The process 700 also resets (at 715) the timer when the process receives (at 710) the next SC monitoring message for the service class before the timer expires. At 715, the process resets the lost-SCMM count that it maintains for the service class in its stat storage 159. Also, if the SCMM tracker generated state for the service class is currently degraded (i.e., unstable), the process resets (at 715) this state of the service class to operational.

As mentioned above, when a first forwarding node informs a second forwarding node that a service class has degraded or has failed (e.g., as determined by the first forwarding node's PQM calculations or SCMM tracking), the second forwarding node reduces or eliminates its use of the service class. Also, in such a case, one or both of the forwarding nodes generates a notification (e.g., sends one or more notification packets) to another forwarding node, a server, or a controller to provide notification of the degradation or failure of a service class.

Figure 8:
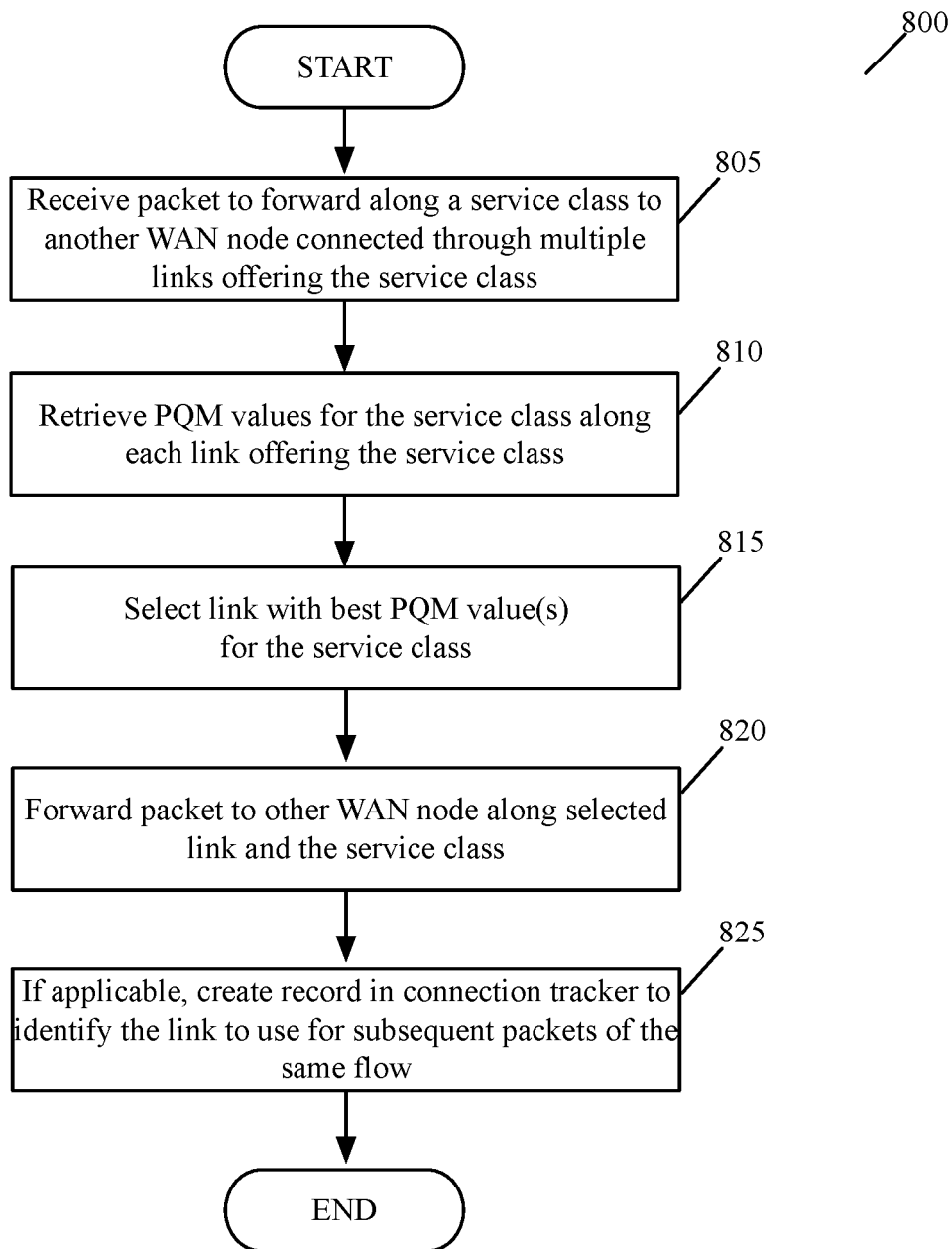
FIG. 8 illustrates a process that a forwarding node of FIG. 9 uses to distribute egress traffic to another forwarding node through two or more different network links that serve as alternative paths to the other forwarding node.

In addition to maintaining usability states for the service classes, some embodiments perform other operations based on the PQM values computed for the different service classes. FIG. 8 illustrates a process 800 that a forwarding node uses to distribute egress traffic to another forwarding node through two or more different network links that serve as alternative paths to the other forwarding node. For a packet or flow associated with a service class, the process uses the PQM values of that service class along two or more links as well as the PQM value of non-QoS aware link, to select the link for the packet or flow.

This process will be explained by reference to FIG. 9, which illustrates an edge WAN forwarding node 902 forwarding packet flows to another edge WAN forwarding node 904 through one of three different paths 906, 908, and 910 between them. The edge forwarding nodes 902 and 904 in this example are at two different branch offices 950 and 952 of an enterprise. Each branch office 950 or 952 has its own local area network (LAN) that connects the devices (e.g., computers, etc.) at the branch office. Through the forwarding nodes 902 and 904, a WAN is formed to connect the branch office LANs. This WAN is an overlay SD-WAN that is established by using overlay network headers for the packets processed by the WAN. The forwarding nodes 902 and 904 in some embodiments use encapsulating tunnel headers to allow the packet's overlay network headers to be transparent to the underlay network fabric that the packets traverse.

Two of three paths 906 and 908 between the edge nodes 902 and 904 are provided by two QoS aware links that connect the forwarding node 902 to two sets of transit MPLS nodes 912 and 914 of an MPLS network 965. The two sets of transit MPLS nodes 912 and 914 may or may not use an overlapping set of MPLS circuits. The third path 910 uses a non-QoS aware broadband network link of the forwarding node 902 (e.g., such as a broadband cable modem connection) to connect this forwarding node to the forwarding node

904. This path 910 is established by not only transit broadband forwarding nodes (not shown) but also by a gateway 916 in a public cloud datacenter 960.

As shown in FIG. 8, the process 800 receives (at 805) a packet to forward to the other WAN forwarding node, called the destination forwarding node. This packet is associated with a service class based on a service class identifier that accompanies the packet, or based on a classification operation that associates the packet to the service class (e.g., a classification operation that matches the packet's header values with an identifier of a classification rule that provides the service class for the packet).

The forwarding node that executes the process 800 connects to the destination forwarding through multiple paths facilitated by multiple network links, at least two of which are QoS aware links that offer the service class associated with the packet. FIG. 9 illustrates an example of three paths 906, 908, and 910 between forwarding node 902 and 904, with two paths 906 and 908 using two QoS aware links of the forwarding node 902 that connect to two MPLS circuits 912 and 914 and the third path 910 using a non-QoS aware link and the gateway 916.

At 810, the process retrieves the PQM values for the received packet's associated service class along each QoS aware link connecting the forwarding node of the process 800 to the destination forwarding node. The process 800 also retrieves (at 810) the PQM value(s) of any non-QoS aware link connecting the forwarding node of the process 800 to the destination forwarding node.

Figure 9:
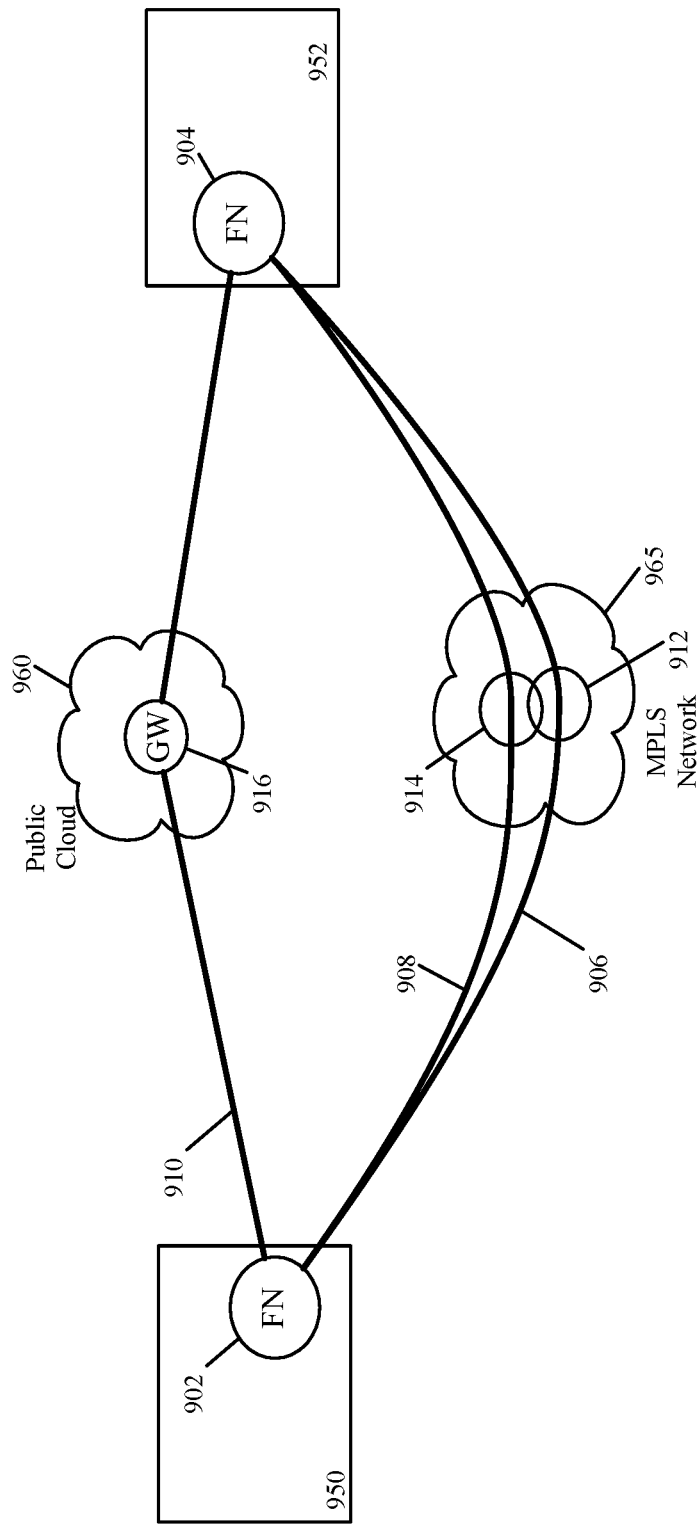
FIG. 9 illustrates an edge WAN forwarding node forwarding packet flows to another edge WAN forwarding node through one of three different paths between them.

Let's assume that a received packet at the forwarding node 902 in FIG. 9 is associated with service class 2. Hence, at 810, the forwarding node 902 identifies the set of PQM values associated with the service class 2 along each of the two QoS aware links that uses paths 906 and 908 and MPLS circuits 912 and 914, as well as the set of PQM values associated with non-QoS aware broadband link that uses the path 910 and the gateway 916. The non-QoS aware link has one set of PQM values as it does not have different service classes for which the PQM value sets can be individually computed.

Next, the process 800 selects (at 815) one of the network links for the packet, and then forwards (at 820) the packet along the service class of the selected network link so that it can reach the destination forwarding node. To forward the packet along the service class of the selected network link, the process associates (at 820) the packet with the sequence number for the service class of the selected network link.

To select the network link for the packet at 815, the process 800 in some embodiments determines which of the PQM value sets identified at 810 has the best PQM value(s) for the received packet. In some embodiments, the process 800 computes (at 815) a weighted sum for each identified PQM value set, and then selects the PQM value set that has the best weighted sum (e.g., the smallest weighted sum). For instance, in the above-mentioned example illustrated in FIG. 9, the forwarding node 902 computes a weighted sum for each of retrieved PQM value sets associated with service class 2 along each of the QoS aware links that uses the paths 906 and 908 and the MPLS circuits 912 and 914, and a weighted sum for the retrieved PQM value set of the non-QoS aware link that uses the path 910 and the gateway 916. It then selects one of the links that use the paths 906, 908 or 910 that has the best weighted sum.

Other embodiments select the network link differently at 815. For instance, different types of PQM values are important for different packet flows. Hence, in some embodiments, the process 800 selects a network link for the packet by selecting the PQM value type that is most important to the packet's flow, and then using this type's PQM values of the particular class to select the network link with the "best" PQM value.

For example, the forwarding node 902 can determine that the packet is part of a VOIP (voice over IP) message flow that cannot tolerate delay. In some embodiments, the node 902 makes this determination based on deep packet inspection, while in other embodiments it makes this determination based on classification rules that associate different IP and port addresses with different type of applications. After determining that the packet is part of a VOIP packet flow, the forwarding node 902 identifies the delay value in the three sets of PQM values for the three links that use the paths 906, 908 and 910, and then select the link that has the smallest delay value.

Some embodiments perform the packet distribution among the network links on a per packet basis, while other embodiments perform this packet distribution on a per flow basis. Hence, for the embodiments that perform this distribution on a per flow basis, the process 800 creates (at 825) a record in a connection tracking storage that associates the flow identifier of the packet (received at 805) with the link that was selected for this packet at 815, and then ends. The process 800 does not perform the operation at 825 in the embodiments where it has to re-assess the link to use for each packet of a flow.

The process 800 of FIG. 8 is performed by the ingress pipeline 122 of a forwarding node. In some embodiments, the ingress pipeline (1) identifies multiple available links that provided multiple different paths to the destination IP address of the packet, (2) identifies the PQM values for these links for the service class associated with the packet, and then (3) selects the link based on these PQM values. In other embodiments, the ingress pipeline (1) identifies an egress WAN edge node or a next hop WAN node from the destination IP address of packet, (2) identifies multiple different to this egress or next hop node, (3) identifies the PQM values for these links for the service class associated with the packet, and then (4) selects the link based on these PQM values.

Instead of just picking the network link that offers the best PQM value or set of PQM values for a received packet associated with a particular service class, some embodiments perform a load balancing operation to distribute the load across two or more network links that offer the particular service class. This load balancing operation in some embodiments relies on load balancing criteria that are computed based on the PQM values that are computed for the particular service class for the two or more service classes.

The load balancing criteria in some embodiments are weight values that are computed based on the PQM values. In some embodiments, the weight values are also computed based on the depth of queues used to temporarily store packets before they are transmitted by the schedulers of the forwarding nodes. The load balancing operation in some embodiments can be performed on a per-flow basis or per-packet basis. When performed on a per-packet basis, the packets of one flow can be split in two or more streams that are sent along two or more network links that offer the desired service class for the packet. This increases the egress rate of the forwarding node for the flow as it allows the flow's packets to use the available throughput of multiple network links that offer the QoS for the particular service class.

Figure 10:
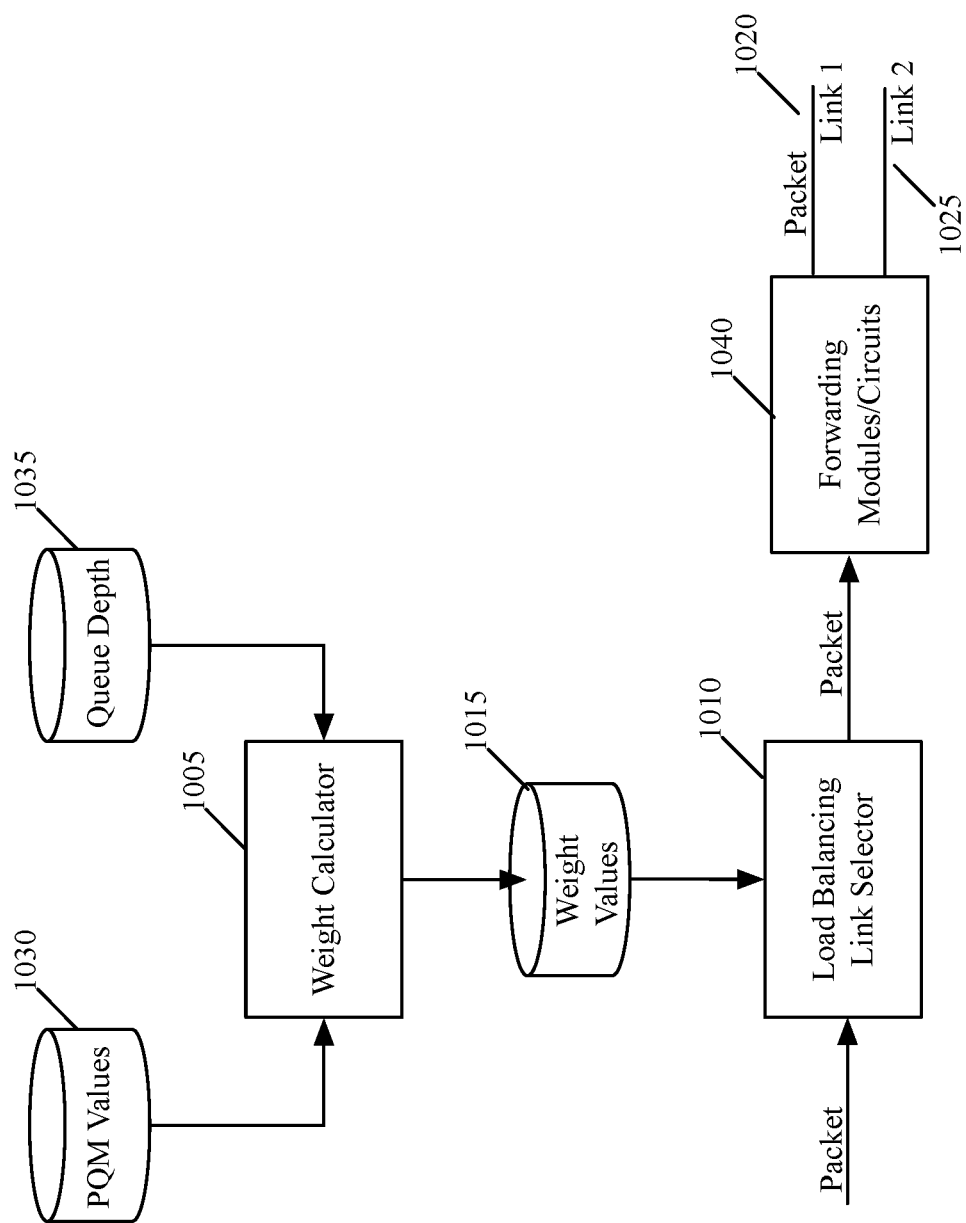
FIG. 10 illustrates an example of transmit-side components of a forwarding node that perform a load balancing operation.
Figure 11:
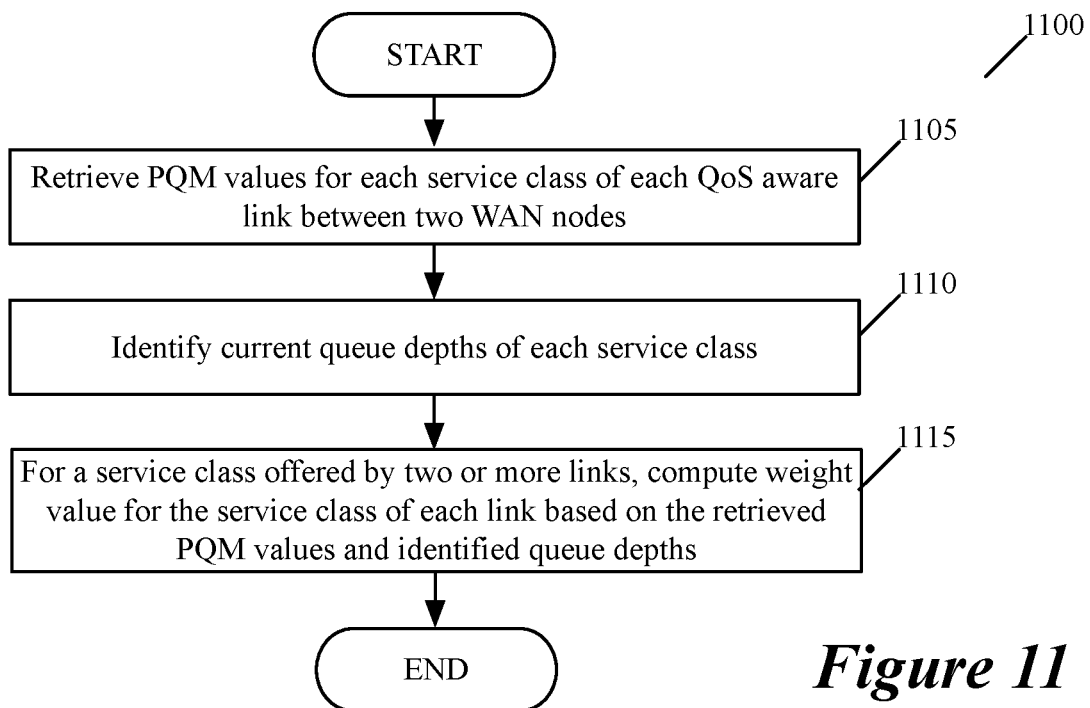
FIG. 11 illustrates a process performed by a weight calculator of FIG. 10 in some embodiments.
Figure 12:
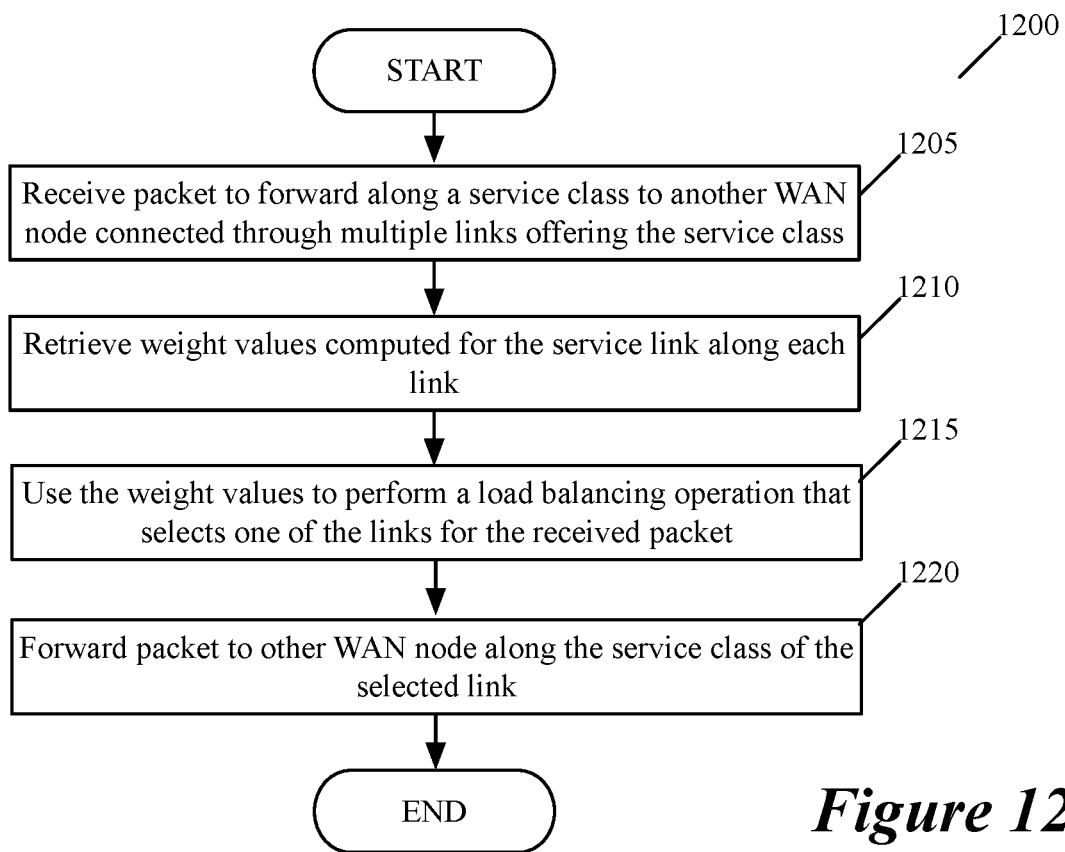
FIG. 12 illustrates a process performed by the load-balancer of FIG. 10 in some embodiments.

FIG. 10 illustrates an example of transmit-side components of a forwarding node that perform this load balancing operation. These components include a weight calculator 1005 and a load-balancing link selector 1010. FIGS. 11 and 12 illustrates processes 1100 and 1200 that these components perform in some embodiments. The weight calculator 1005 performs the process 1100 on a periodic basis. From a PQM storage 1030, the weight calculator retrieves (at 1105) a set of PQM values for each service class of each QoS aware link between two WAN nodes.

At 1110, the weight calculator also obtains queue depth values from queue depth storage 1035. The queue depths define the current queue depths or average queue depths of the service queues for each service class. In some embodiments, the schedulers of the service classes maintain such queue depth values and the weight calculator 1005 obtains the queue depth values from the schedulers. At 1115, the weight calculator 1005 then computes for each service class two or more weight values associated with two or more QoS aware links connecting the forwarding node of the process 1100 to another WAN forwarding node (the destination forwarding node). This computation in some embodiments is a normalized weighted sum of the PQM and queue depth values that produces two or more fractional weight values that collectively sum up to 1.

The generated weight values then represent the desired load balanced distribution of a flow's packets across the two or more links to the destination forwarding node. In the example illustrated in FIG. 10, the weight calculator 1005 computes two weight values for each service class in the set of service classes offered by the two QoS aware links 1020 and 1025 (e.g., two MPLS links) that connect the weight calculator's forwarding node to another WAN forwarding node. The computed weight values are stored in the weight value storage 1015 of FIG. 10.

For each packet flow that is associated with a service class, the load balancer 1010 then uses the two weight values for that service class to distribute the packets of the flow among the two links 1020 and 1025. FIG. 12 illustrates a process 1200 performed by the load balancer 1010 in some embodiments. As shown, the process starts (at 1205) when the load balancer receives a packet to forward along a service class to another WAN node that connects to the load balancer's WAN node through multiple links that offer the service class. Next, at 1210, the weight values computed for the service class along the two or more links to the other WAN node are identified. The load balancer then performs (at 1215) a load balancing operation to select one of the links for the received packet. The load balancer then provides the packet with the selected link to forwarding modules or circuits 1040 of the forwarding node so that the packet can be forwarded (at 1220) to the other WAN forwarding node along the service class of the selected link.

For instance, in some embodiments, the load balancer performs a round robin selection of one of two links based on the weight values. Let's assume one of the weight values is 0.4, while the other weight value is 0.6. The round robin selection of the load balancer of some embodiments then directs the first four packets of a flow along the service class of the first link, the next six packet of the flow along the service class of the second link, the next four packets of the flow along the service class of the first link, the next six packets of the flow along the service class of the second link, and so on.

Instead of using static service class assignments based on classification rules or service class identifications in packet headers, some embodiments dynamically select a service class for a packet by analyzing the PQM values computed for the service classes and selecting the service class that offers the best PQM value(s) at the time that the packet is being processed by the forwarding node.

Figure 13:
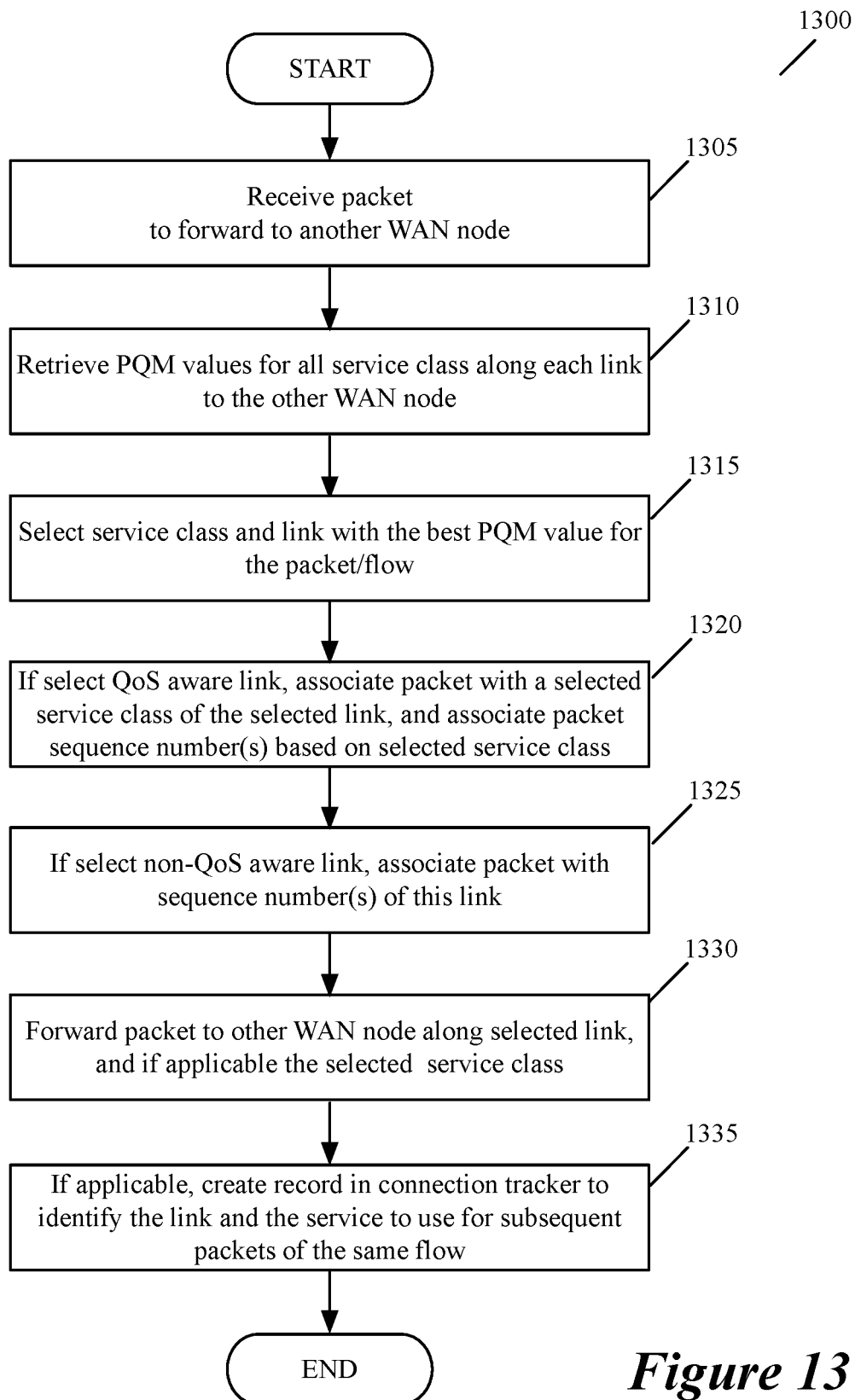
FIG. 13 illustrates a process that dynamically selects the service class for a packet or flow.

FIG. 13 illustrates a process that dynamically selects the service class for a packet or flow. The forwarding node that executes the process 1300 connects to another WAN forwarding node through multiple paths facilitated by multiple network links, at least two of which are QoS aware links that offer several service classes. The process 1300 starts (at 1305) when the forwarding node receives a packet to forward to the other WAN forwarding node, called the destination forwarding node. For instance, in the example illustrated in FIG. 9, the forwarding node 902 would receive a packet to forward to the forwarding node 904, along one of the two QoS aware links that use the paths 906 and 908 and circuits 912 and 914, or the third non-QoS aware link that uses the path 910 and the gateway 916. The received packet is not associated with a service class, or if it is, the process 1300 ignores this association.

At 1310, the process retrieves the PQM values for all the service classes of each link that offers a path to the destination node from the forwarding node of the process 1300. In the example of FIG. 9, the retrieved PQM values would be PQM values of all the service classes of the two QoS aware links that use the paths 906 and 908 and circuits 912 and 914 and the PQM values for the third non-QoS aware link that uses the path 910 and the gateway 916.

Next, at 1315, the process 1300 selects for the packet the link that has the best retrieved PQM value or PQM value set. The selected link in some embodiments can be the non-QoS aware link best retrieved PQM value or PQM value set, or it can be a QoS aware link that has a service class with the best retrieved PQM value or PQM value set. To select the network link for the packet at 1315, the process 1300 use different techniques in different embodiments to identify which of the PQM value sets identified at 1310 has the best PQM value(s) for the received packet.

In some embodiments, the process 1300 computes (at 1315) a weighted sum for each identified PQM value set, and then selects the PQM value set that has the best weighted sum (e.g., the smallest weighted sum). For instance, in the example illustrated in FIG. 9, the forwarding node 902 computes a weighted sum for each of retrieved PQM value sets associated with each service class of each QoS aware link that uses the path 906/908 and circuit 912/914, and a weighted sum for the retrieved PQM value set of the non-QoS aware link that uses the path 910 and the gateway 916. It then selects the link that has the best weighted sum. When the selected link is one of the QoS aware links, the forwarding node 902 selects the link's service class for the received packet that provided the best weighted sum.

Other embodiments select the network link differently at 1315. For instance, different types of PQM values are important for different packet flows. Hence, in some embodiments, the process 1300 selects a network link for the packet by selecting the PQM value type that is most important to the packet's flow, and then using this type's PQM values to select the network link with the "best" PQM value.

For example, the forwarding node 902 can determine that the packet is part of a VOIP (voice over IP) message flow that cannot tolerate delay. Hence, the forwarding node 902 identifies the delay value in the three sets of PQM values for the three links that use the paths 906 908, and 910, and then select the link that has the smallest delay value. When the selected link is one of the QoS aware links, the forwarding node 902 selects the link's service class for the received packet that provided the best delay.

When the selected link is a QoS aware link, the process associates (at 1320) the packet with the selected service class of the selected link, and forwards (at 1330) the packet with the associated selected service class to the other forwarding node along the selected network link. To associate the packet with the selected service class, the process in some embodiments associates the packet with the identifier of the selected service class (e.g., its DSCP tag) and the next sequence number for the selected service class. When the selected link is a non-QoS aware link, the process 1300 associates (at 1325) the packet with the next sequence number for the selected non-QoS link, and forwards (at 1330) the packet to the other forwarding node along the selected non-QoS link.

Some embodiments perform the link selection process 1300 on a per packet basis, while other embodiments perform this link selection process 1300 on a per flow basis. For the embodiments that perform this selection on a per flow basis, the process 1300 creates (at 1335) a record in a connection tracking storage that associates the flow identifier of the packet (received at 1305) with the link that was selected for this packet at 1315, and then ends. The process 1300 does not perform the operation at 1335 in the embodiments where it has to re-assess the link selection for each packet of a flow.

The dynamic selection and association of a service class for a packet allows packets of a critical application to always use service classes that provide the best PQM values at any given time. In some embodiments, the dynamic selection of the service class can be based on the type of PQM value that is most important to the critical application. For instance, only a minimal level of jitter might be acceptable for a particular application. Hence, for this application, the method of some embodiments uses the computed jitter values of the service classes of a network link to select one service class for the packets of the particular application. In this manner, the dynamic selection of the service classes can itself be a function of the application type. Instead of dynamically selecting and associating a service class on a per-packet basis, other embodiments dynamically select and associate a service class on a per-flow basis. Some of these embodiments perform this dynamic selection and association when processing the first packet of the flow.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
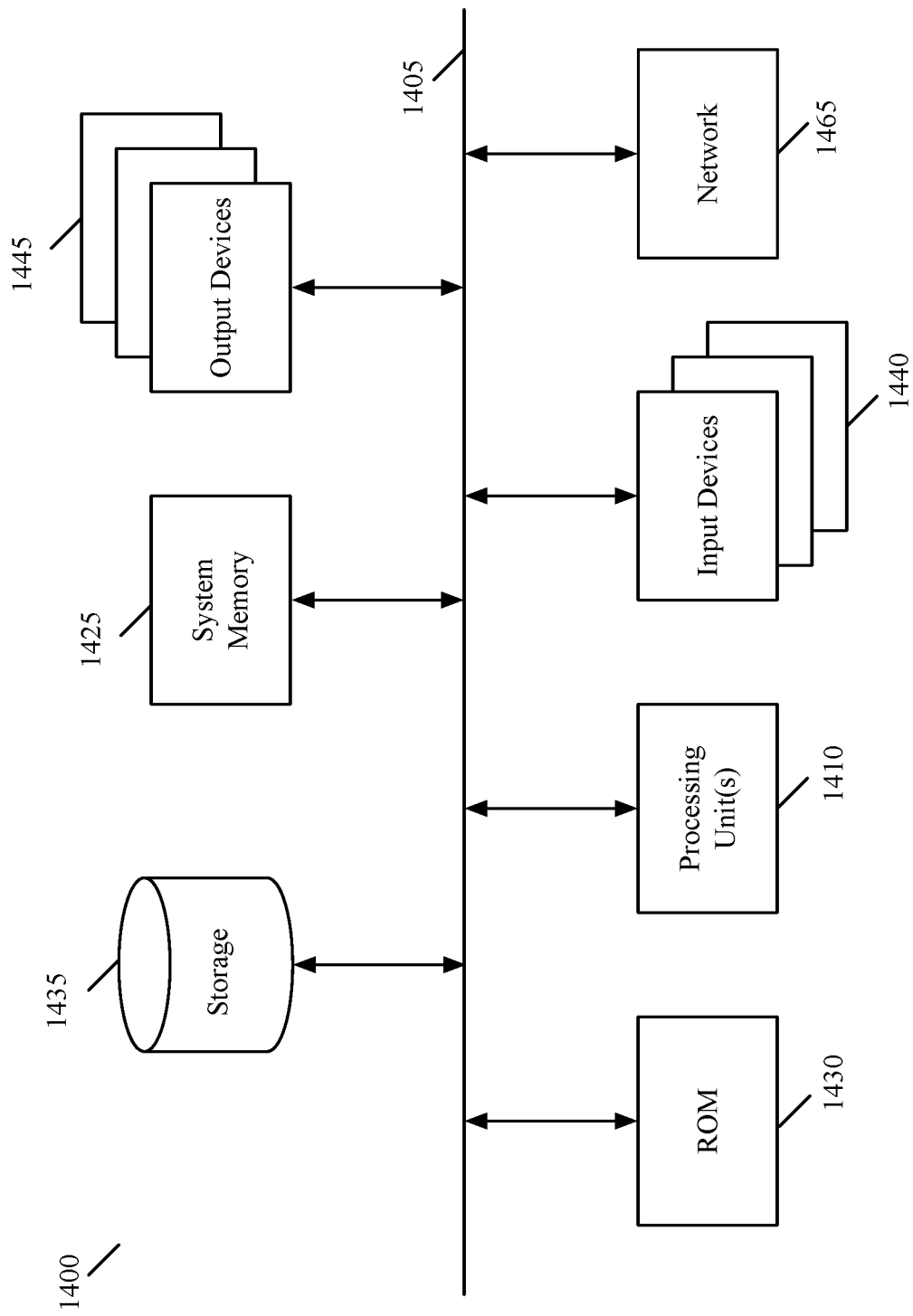
FIG. 14 conceptually illustrates an electronic system with which some embodiments of the invention are implemented.

FIG. 14 conceptually illustrates a computer system 1400 with which some embodiments of the invention are implemented. The computer system 1400 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage device 1435, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such as random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the computer system. The input devices 1440 include alphanumeric keyboards and pointing devices (also called "cursor control devices"). The output devices 1445 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 14, bus 1405 also couples computer system 1400 to a network 1465 through a network adapter (not shown). In this manner, the computer can be a part of a network of computers (such as a local area network ("LAN"), a wide area network ("WAN"), or an Intranet), or a network of networks (such as the Internet). Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third party's private cloud datacenters (e.g., datacenters that the third party uses to deploy cloud gateways for different entities in order to deploy virtual networks for these entities).

Also, even though MIMS links are described as the QoS aware links in several examples above, one of ordinary skill will realize that other embodiments use other QoS aware links. For instance, some embodiments use QoS aware wireless links (such as 5G or later cellular links). Thus, one of ordinary skill in the art would understand that the invention is not to be limited by the foregoing illustrative details, but rather is to be defined by the appended claims.

The invention claimed is:

1. A method of quantifying quality of a plurality of service classes provided by a link between first and second forwarding nodes in a wide area network, the method comprising:
   at the second forwarding node:
      based on packets sent from the first forwarding node for a first service class, computing and storing a first path quality metric (PQM) value for the first service class to quantify the quality of service provided to packets processed through the first service class;
      based on packets sent from the first forwarding node for a second service class, computing and storing a second PQM value for the second service class to quantify the quality of service provided to packets processed through the second service class; and
      forwarding the first and second PQM values from the second forwarding node to the first forwarding node for the first forwarding node to use to assess the quality of the first and second service classes for forwarding data messages to the second forwarding node, wherein different service classes provided by the link are associated with different quality of service guarantees.

2. The method of claim 1, wherein computing the first and second PQM values comprises using unique sequence numbers for first and second service classes to compute the first and second PQM values.

3. The method of claim 2, wherein each sequence number has first and second portions, the first portion comprising a first sequence number that counts in one range, and the second portion comprising a value associated with the service class.

4. The method of claim 3, wherein the value in the second portion is a DSCP (differentiated service code point) identifier.

5. The method of claim 1, wherein the PQM values comprise loss values measured by counting number of packets not received at the second forwarding element within each of a plurality of particular time periods.

6. The method of claim 5, wherein computing the PQM loss value comprises an updating average loss value as packet loss values are counted.

7. The method of claim 5, wherein counting number of packets not received comprises using unique sequence numbers for each service class to determine whether packets are being received in the correct sequence.

8. The method of claim 1, wherein the PQM values comprise delay values measured by using time stamps associated with the received packets to determine transit duration for the packets.

9. The method of claim 8, wherein computing the PQM delay value comprises an updating average delay value as packet delay values are computed.

10. The method of claim 8, wherein the PQM values further comprise jitter values that express the rate of change in the computed delay values.

11. The method of claim 1, wherein different PQM values are computed for the first and second service classes in order to treat each service class as an independent logical subpath of the path between first and second forwarding elements.

12. The method of claim 1, wherein PQM values are computed for the service classes and not for service queues utilized because service queue configurations that are used by a physical network connecting the first and second forwarding nodes, are not known.

13. The method of claim 1 further comprising:
at the first forwarding node:
- based on packets sent from the first forwarding node for the first and second service classes, computing first and second PQM values for first and second service classes to quantify the QoS guarantees provided to packets processed through the first and second service classes as the packets are forwarded from the second forwarding node to the first forwarding node; and
- forwarding first and second PQM values from the first forwarding node to the second forwarding node for the second forwarding node to use to assess the quality of the first and second service classes for forwarding data messages to the first forwarding node.

14. A non-transitory machine readable medium storing a program for quantifying quality of a plurality of service classes provided by a link between first and second forwarding nodes in a wide area network, the program for execution by at least one processing unit of a second forwarding node and comprising sets of instructions for:
- based on packets sent from the first forwarding node for a first service class, computing and storing a first path quality metric (PQM) value for the first service class to quantify the quality of service provided to packets processed through the first service class;
- based on packets sent from the first forwarding node for a second service class, computing and storing a second PQM value for the second service class to quantify the quality of service provided to packets processed through the second service class; and
- forwarding the first and second PQM values from the second forwarding node to the first forwarding node for the first forwarding node to use to assess the quality of the first and second service classes for forwarding data messages to the second forwarding node, wherein different service classes provided by the link are associated with different quality of service guarantees.

15. The non-transitory machine readable medium of claim 14, wherein computing the first and second PQM values comprises using unique sequence numbers for first and second service classes to compute the first and second PQM values.

16. The non-transitory machine readable medium of claim 15, wherein each sequence number has first and second portions, the first portion comprising a first sequence number that counts in one range, and the second portion comprising a value associated with the service class.

17. The non-transitory machine readable medium of claim 16, wherein the value in the second portion is a DSCP (differentiated service code point) identifier.

18. The non-transitory machine readable medium of claim 14, wherein the PQM values comprise loss values measured by counting number of packets not received at the second forwarding element within each of a plurality of particular time periods.

19. The non-transitory machine readable medium of claim 18, wherein computing the PQM loss value comprises an updating average loss value as packet loss values are counted.

20. The non-transitory machine readable medium of claim 18, wherein counting number of packets not received comprises using unique sequence numbers for each service class to determine whether packets are being received in the correct sequence.

* * * * *